United States Patent
Feirer et al.

(10) Patent No.: US 12,535,384 B2
(45) Date of Patent: Jan. 27, 2026

(54) ACOUSTIC EMISSION DAMAGE CLASSIFICATION OF ROTATING MACHINERY VIA INTENSITY ANALYSIS

(71) Applicant: University of South Carolina, Columbia, SC (US)

(72) Inventors: Brenna Feirer, Columbia, SC (US); Paul Ziehl, Irmo, SC (US); Rafal Anay, Columbia, SC (US)

(73) Assignee: University of South Carolina, Columbia, SC (US)

( * ) Notice: Subject to any disclaimer, the term of this patent is extended or adjusted under 35 U.S.C. 154(b) by 0 days.

(21) Appl. No.: 17/533,244

(22) Filed: Nov. 23, 2021

(65) Prior Publication Data
US 2022/0364954 A1    Nov. 17, 2022

Related U.S. Application Data

(60) Provisional application No. 63/141,670, filed on Jan. 26, 2021.

(51) Int. Cl.
G01M 13/045    (2019.01)

(52) U.S. Cl.
CPC .................. G01M 13/045 (2013.01)

(58) Field of Classification Search
CPC ....... G01H 1/00; G01H 1/003; G01M 5/0033; G01M 5/0066; G01M 13/045; G01N 29/04; G01N 29/12; G01N 29/14; G01N 29/44; G01N 29/48; G01N 29/4409; G01N 29/4427; G01N 29/4436; G01N 29/4445; G01N 29/4454; G01N 29/4481
See application file for complete search history.

(56) References Cited

U.S. PATENT DOCUMENTS

| | | | | |
|---|---|---|---|---|
| 6,076,405 A | * | 6/2000 | Schoess | G01M 5/0066 73/587 |
| 7,184,930 B2 | * | 2/2007 | Miyasaka | G01M 17/10 384/445 |
| 10,648,948 B2 | * | 5/2020 | Aoki | G01N 29/4454 |
| 2006/0171625 A1 | * | 8/2006 | Jones | F03D 80/70 384/624 |
| 2014/0142872 A1 | * | 5/2014 | Hedin | G05B 23/024 702/56 |

FOREIGN PATENT DOCUMENTS

GB         2430034 A  *  3/2007  ............ F16C 19/527

OTHER PUBLICATIONS

Weill, A. (2014). Acoustic Radiation. In: Njoku, E.G. (eds) Encyclopedia of Remote Sensing. Encyclopedia of Earth Sciences Series. Springer, New York, NY. https://doi.org/10.1007/978-0-387-36699-9_1 (Year: 2014).*

(Continued)

*Primary Examiner* — Alvaro E Fortich
*Assistant Examiner* — Martin Walter Braunlich
(74) *Attorney, Agent, or Firm* — Offit Kurman; Douglas L. Lineberry

(57) ABSTRACT

Described herein are acoustic emission damage classification methods and systems employing intensity analysis to monitor the state of rotating machinery to classify the damage occurring to a mechanical object.

14 Claims, 36 Drawing Sheets

(56) References Cited

OTHER PUBLICATIONS

Niezrecki, Christopher., ed. Structural Health Monitoring and Damage Detection, vol. 7: Proceedings of the 33rd IMAC, A Conference and Exposition on Structural Dynamics, 2015. 1st ed. 2015. Cham: Springer International Publishing, 2015. Web. (Year: 2015).*
Scanlon, Patricia, Alan M Lyons, and Alan O'Loughlin. "Acoustic Signal Processing for Degradation Analysis of Rotating Machinery to Determine the Remaining Useful Life." 2007 IEEE Workshop on Applications of Signal Processing to Audio and Acoustics. IEEE, 2007. 90-93. (Year: 2007).*

* cited by examiner

|  | Round 1 | Round 2 | Round 3 | Round 4 |
|---|---|---|---|---|
| Run Time: | 25.8 hours | 16.9 hours | 15.15 hours | 38.01 hours |
| Pressure : | 625 psi | 1250 psi | 1250 psi | 1825 psi |
| Rotation Cycle : | 10Hz, 15Hz, 20Hz every minute | 15Hz, 20Hz, every two minute | 15Hz, 20Hz, every two minutes | 15Hz, 20Hz, every two minutes |
| Picture Timing | After Failure using general camera | After Failure using general camera | After Failure using general camera | After major spikes using general camera and microscopic camera |

FIG. 5

FIG. 18

ACOUSTIC EMISSION DAMAGE CLASSIFICATION OF ROTATING MACHINERY VIA INTENSITY ANALYSIS

STATEMENT REGARDING FEDERALLY SPONSORED RESEARCH

This disclosure was made with government support under N00174-17-1-0006 awarded by Naval Engineering Education Consortium (NEEC). The government has certain rights in the disclosure.

TECHNICAL FIELD

The subject matter disclosed herein is generally directed to acoustic emission damage classification methods and systems employing intensity analysis to monitor the state of rotating machinery to classify the damage occurring to a mechanical object.

BACKGROUND

Acoustic Emission (AE) is "the class of phenomena whereby transient elastic waves are generated by the rapid release of energy from localized sources within a material, or the transient waves so generated." See, ASTM E1316. (2006). Standard terminology for nondestructive examinations. American Standard for Testing and Materials, 1-33. AE parameters can detect defects prior to the appearance on the vibration acceleration range for thrust loaded ball bearings. See, Yoshioka, T., & Fujiwara, T. (1987). Paper II (i) *Measurement of propagation initiation and propagation time of rolling contact fatigue cracks by observation of acoustic emission and vibration.* In *Tribology Series* (Vol. 12, pp. 29-33). Elsevier and Acoustic parameters for the recognition of defects in radially loaded ball bearings at low and normal speeds. Tandon, N., & Nakra, B. C. (1990).

Prior attempts at the application of sound-intensity techniques to defect detection in rolling-element bearings have been attempted, see Applied Acoustics, 29 (3), 207-217. However, there are gaps in the current state of the art as well as a need for acoustic emission signal alarm notification, especially with respect to shipboard machinery, such as parameters for acoustic emission monitoring of rolling element bearings. Accordingly, it is an object of the present disclosure to remedy the problem of degradation to rotating machine performance, unforeseen costs and unexpected system failure.

Citation or identification of any document in this application is not an admission that such a document is available as prior art to the present disclosure.

SUMMARY

The above objectives are accomplished according to the present disclosure by providing a method for detecting degradation in rotating performance. The method may include obtaining emission acoustic data from at least one rotating source, analyzing the acoustic data for pattern recognition based on a set of correlated features, classifying crack propagation based on the acoustic data analysis and the set of correlated features, and classifying crack propagation occurs in real time with respect to the at least one rotating source. Further, the set of correlated features may include rise time, amplitude, energy, average frequency, and/or at least one clustering method. Still, the method may include determining a level of damage present within the at least one rotating source. Yet again, the level of damage present may be categorized as minimal damage, crack initiation and propagation or failure. Moreover, the acoustic emission data may include amplitude, initiation frequency, absolute energy, frequency centroid, peak frequency and/or signal strength. Still yet, the at least one rotating source may comprise at least one rotating piece of machinery. Yet further, the method may include conducting intensity analysis via separating the acoustic data into a plurality of sections based on at least one signal strength spike within the acoustic data. Again still, the method may assign a severity and historic index to each of the plurality of sections and create an intensity plot from the assignment. Again further, the method may differentiate crack initiation and propagation within the rotating source as compared to failure of the rotating source based on the severity and historic index of the acoustic data. Furthermore, the method may include triggering a signal alarm based on the severity and historic index indicating a crack has initiated or is propagating.

In a further embodiment, a non-destructive crack monitoring system is provided. The system may include at least one sensor configured for detecting acoustic emission data, at least one data acquisition system configured for receiving the acoustic emission data from at least one piece of rotating machinery in real time via the at least one sensor, at least one pattern recognition system configured to separate the acoustic emission data into a plurality of sections based on signal strength spikes within the acoustic emission data, and at least one software platform for analyzing the acoustic emission data and correlating same to a crack condition within the at least one piece of rotating machinery. Further, the at least one pattern recognition system and the at least one software platform may quantify the acoustic emission data based on a set of correlated features including rise time, amplitude, energy, and/or average frequency. Still yet, the at least one pattern recognition system may create at least one cluster to compare at least two correlated features of the acoustic emission data to classify crack propagation within the at least one rotating source. Furthermore, the acoustic emission data compared by the at least one cluster may include amplitude, initiation frequency, absolute energy, frequency centroid, peak frequency and/or signal strength. Still yet again, the system may determine a level of damage present within the at least one piece of rotating machinery categorized as minimal damage, crack initiation and propagation, or failure. Further yet, the at least one rotating piece of machinery is in use when the system monitors the at least one rotating piece of machinery. Yet still, the at least one software platform may establish a damage quantification procedure based on intensity analysis via separating the acoustic emission data into a plurality of sections based on at least one signal strength spike within the acoustic data. Again further, the software platform may assign a severity and historic index to each of the plurality of sections and create an intensity plot from the assignment. Further again, the software platform may differentiate crack initiation and propagation within the rotating source from failure of the rotating source based on the severity and historic index of the acoustic data. Further still, the system may have a signal alarm that is triggered based on the severity and historic index indicating a crack has initiated or is propagating.

These and other aspects, objects, features, and advantages of the example embodiments will become apparent to those having ordinary skill in the art upon consideration of the following detailed description of example embodiments.

BRIEF DESCRIPTION OF THE DRAWINGS

An understanding of the features and advantages of the present disclosure will be obtained by reference to the following detailed description that sets forth illustrative embodiments, in which the principles of the disclosure may be utilized, and the accompanying drawings of which:

FIG. 5 shows Table 1, which displays data for multiple tests of the current disclosure.

FIGS. 16-20 each show bearing damage to separate bearings.

Figure 1:
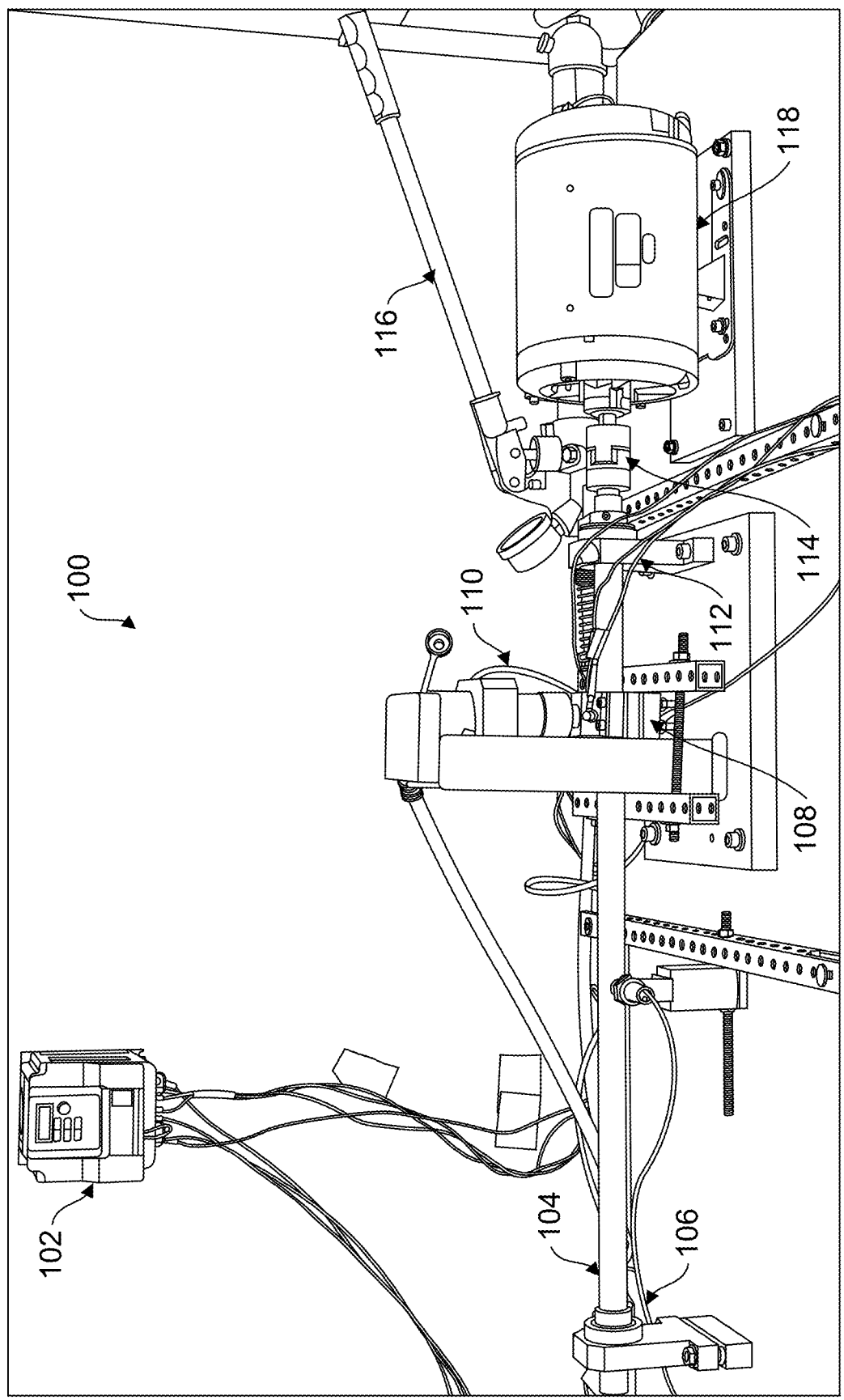
FIG. 1 shows an experiment test bed.

The figures herein are for illustrative purposes only and are not necessarily drawn to scale.

DETAILED DESCRIPTION OF THE EXAMPLE EMBODIMENTS

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further embodiment includes from the one particular value and/or to the other particular value. The recitation of numerical ranges by endpoints includes all numbers and fractions subsumed within the respective ranges, as well as the recited endpoints. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the singular forms "a", "an", and "the" include both singular and plural referents unless the context clearly dictates otherwise.

As used herein, "about," "approximately," "substantially," and the like, when used in connection with a measurable variable such as a parameter, an amount, a temporal duration, and the like, are meant to encompass variations of and from the specified value including those within experimental error (which can be determined by e.g. given data set, art accepted standard, and/or with e.g. a given confidence interval (e.g. 90%, 95%, or more confidence interval from the mean), such as variations of +/−10% or less, +/−5% or less, +/−1% or less, and +/−0.1% or less of and from the specified value, insofar such variations are appropriate to perform in the disclosure. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

The term "optional" or "optionally" means that the subsequent described event, circumstance or substituent may or may not occur, and that the description includes instances where the event or circumstance occurs and instances where it does not.

As used interchangeably herein, the terms "sufficient" and "effective," can refer to an amount (e.g. mass, volume, dosage, concentration, and/or time period) needed to achieve one or more desired and/or stated result(s). For example, a therapeutically effective amount refers to an amount needed to achieve one or more therapeutic effects.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). Reference throughout this specification to "one embodiment", "an embodiment," "an example embodiment," means that a particular feature, structure or characteristic described in connection with the embodiment is included in at least one embodiment of the present disclosure. Thus, appearances of the phrases "in one embodiment," "in an embodiment," or "an example embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure. For example, in the appended claims, any of the claimed embodiments can be used in any combination.

All patents, patent applications, published applications, and publications, databases, websites and other published materials cited herein are hereby incorporated by reference to the same extent as though each individual publication, published patent document, or patent application was specifically and individually indicated as being incorporated by reference.

This innovation introduces high sensitivity, early, and rapid detection of cracking, and real time monitoring that can classify the damage that has occurred. This will prevent degradation to rotating machine performance, unforeseen costs and unexpected system failure.

The first step is using predeveloped unsupervised pattern recognition to create three different clusters. Intensity analysis for damage quantification is conducted by separating acoustic emission data into four (4) sections based on signal strength spikes. Each section is assigned a severity and historic index. Severity and historic index are predeveloped methods of damage analysis. This data is then compiled on an intensity plot. The intensity plot is split into three different areas depending on level of damage occurred, those being: minimal damage, crack initiation and propagation, and failure.

The intensity values of less damage are plotted near the bottom left of the plot while the values of high damage are found in the top right corner. It is seen, such as in the provided FIGS., that the historic index for sections 2 and 3 of all tests is higher than section 4. Sections 2 and 3 are in the middle of the tests and are where crack propagates. Section 4 is at the end of the tests and is where failure of the bearing happens. This points to the conclusion that crack initiation and propagation has a greater severity and historic index then at failure of the bearing. Thus, one can differentiate between whether the item being analyzed is undergoing crack initiation and propagation or failure has already occurred based on a comparison of the severity and historic index of the acoustic emission data.

Acoustic Emission Purpose

The current disclosure nondestructively monitored crack growth in rolling element bearings in a marine environment to determine the acoustic emission parameters which embody crack initiation and propagation. The current disclosure surrounds a signal alarm developed from an AE data pattern recognition method, a damage quantification procedure based on intensity analysis parameters, and a specially made rotating machine test bed to simulate a bearing in use on a submarine.

FIG. 1 shows an experiment test bed 100 of the current disclosure that includes VFD 102, shaft 104, first support bearing 106, bearing housing 108, hydraulic piston 110, second support bearing 112, shaft/motor coupler 114, hydraulic pump 116, and electric motor 118.

Acoustic Emission Setup

The emission set up of the current disclosure includes Four B1025 broadband sensors from Digital Wave Corporation. These were attached to a bearing housing using double bubble epoxy. A Sensor Highway II data acquisition system from Physical Acoustics Corporation was also used. Sampling Rate was 1 million samples/sec, Threshold was 40 dB. The timing parameters were: Peak Definition Time (PDT): 200 microseconds; Hit Definition Time(HDT): 800 microseconds; and Hit Lockout Time(HLP): 1000 microseconds.

Figure 2:
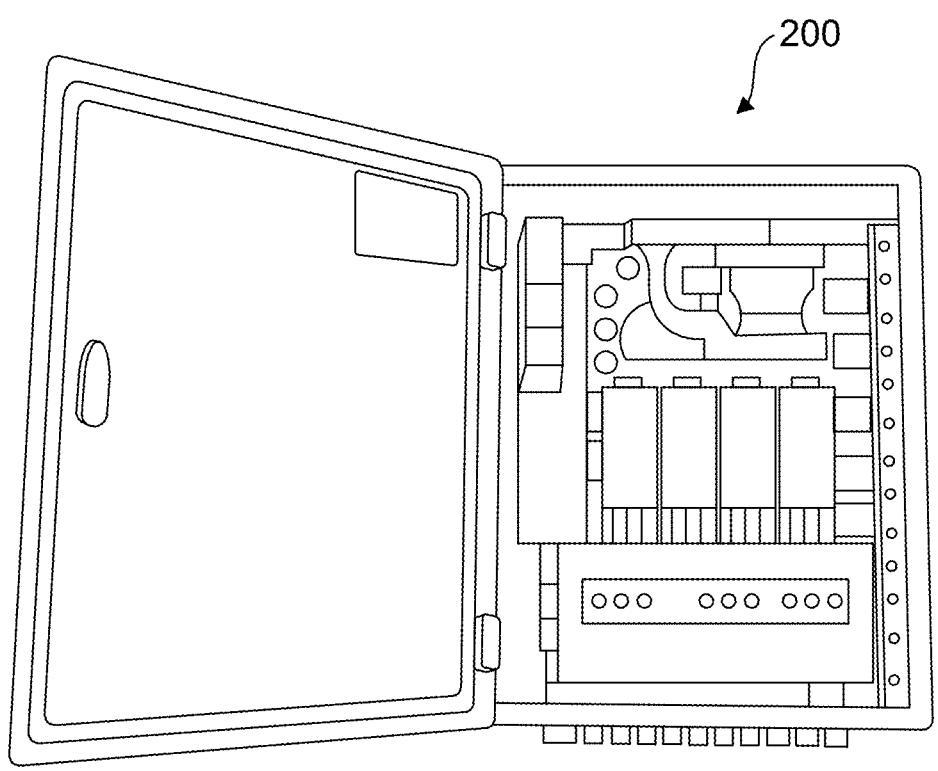
FIG. 2 shows Sensor Highway II.
Figure 3:
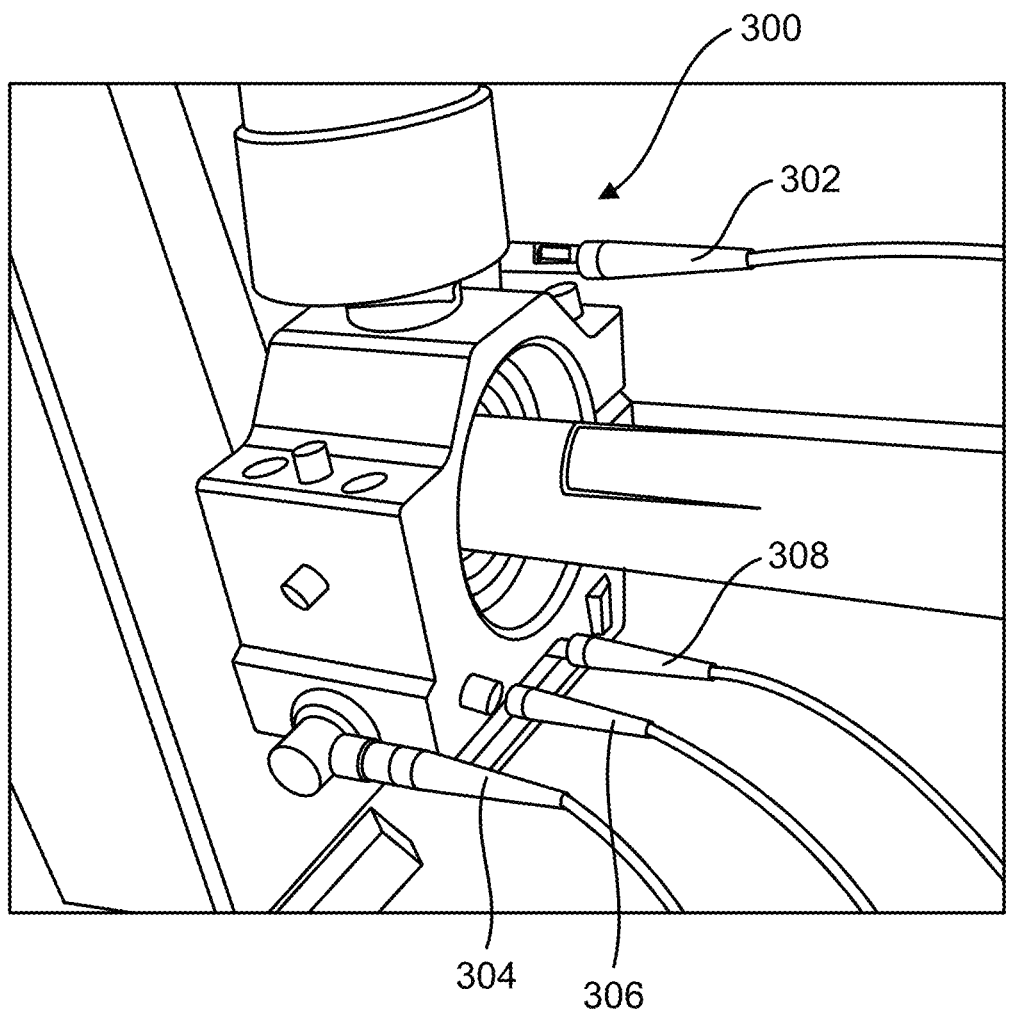
FIG. 3 shows a sensor foundation of the current disclosure.
Figure 4:
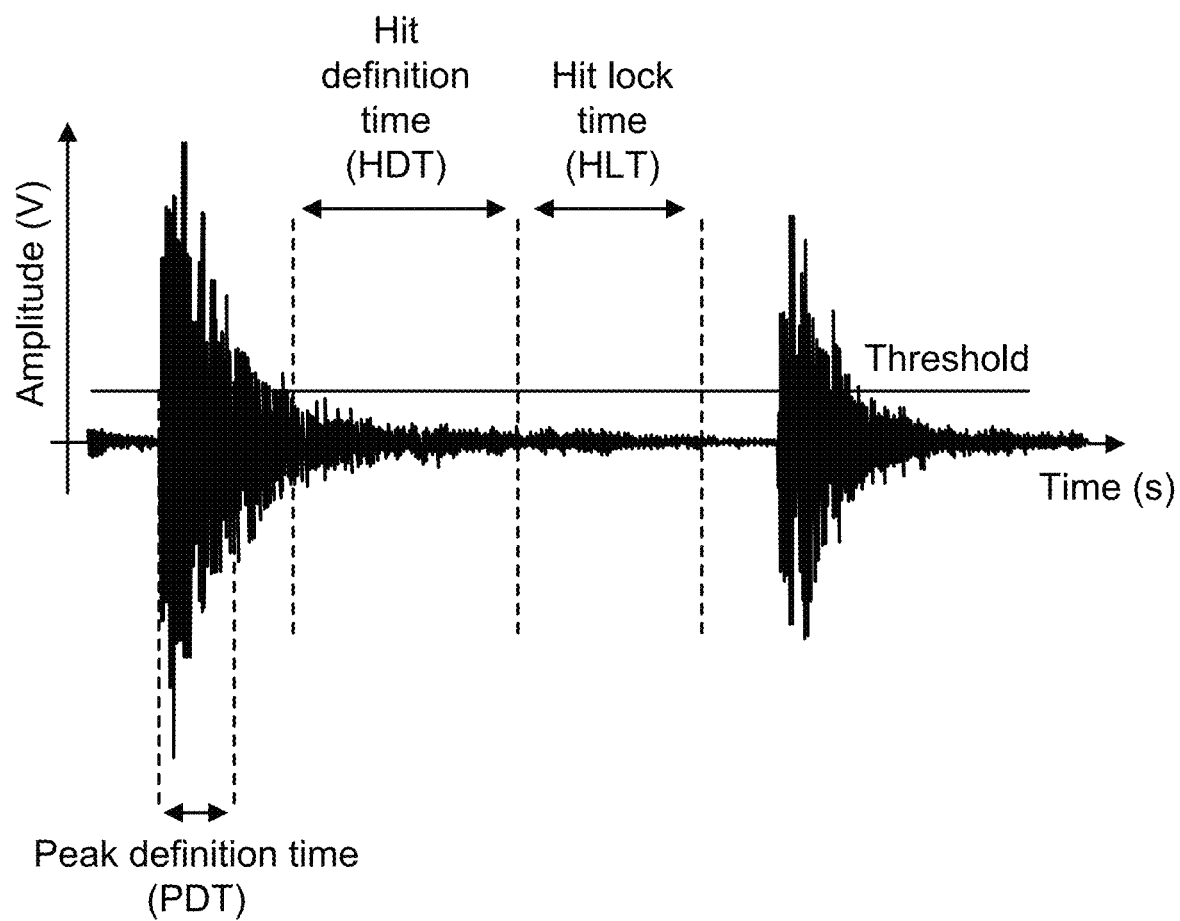
FIG. 4 shows a hit diagram of the current disclosure.

FIG. 2 shows Sensor Highway II 200, available from Physical Acoustics Corporation. FIG. 3 shows sensor foundation 300 including first sensor 302, second sensor 304, third sensor 306, and fourth sensor 308. FIG. 4 shows a hit diagram of the current disclosure. FIG. 5 shows Table 1, which displays data for multiple tests of the current disclosure.

Data Classification

Figure 6A:
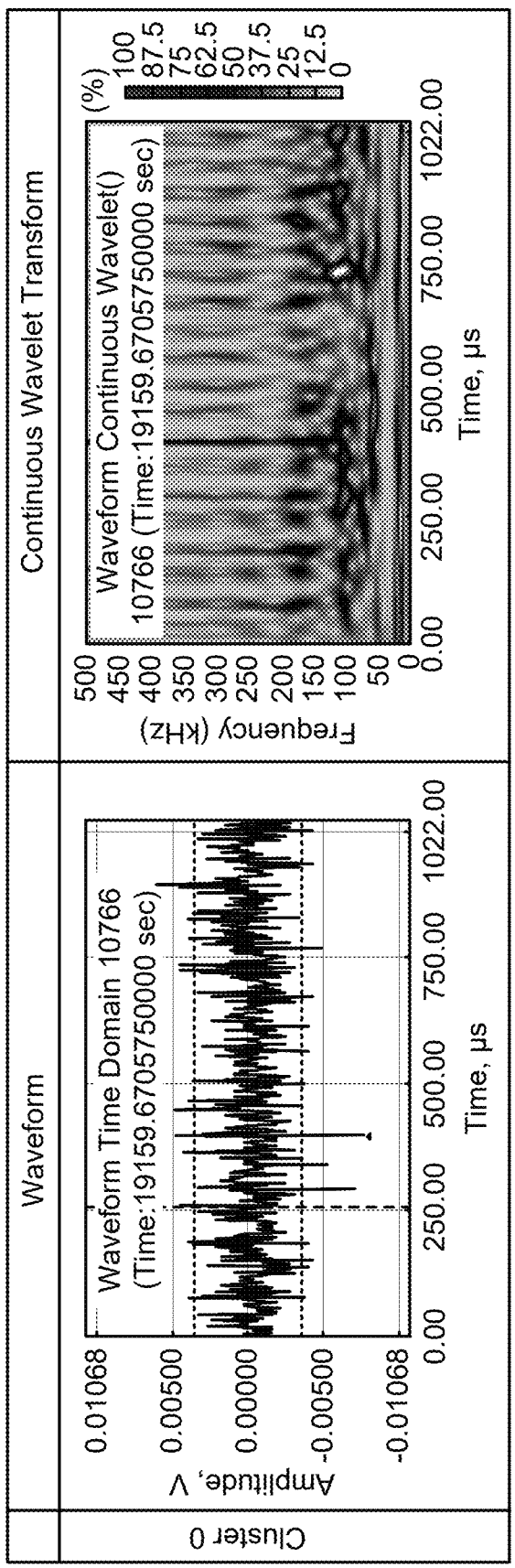
FIG. 6 shows Cluster 1, Cluster 2, and Cluster 3 comparing amplitude versus time for waveform and continuous wavelet transform.
Figure 6B:
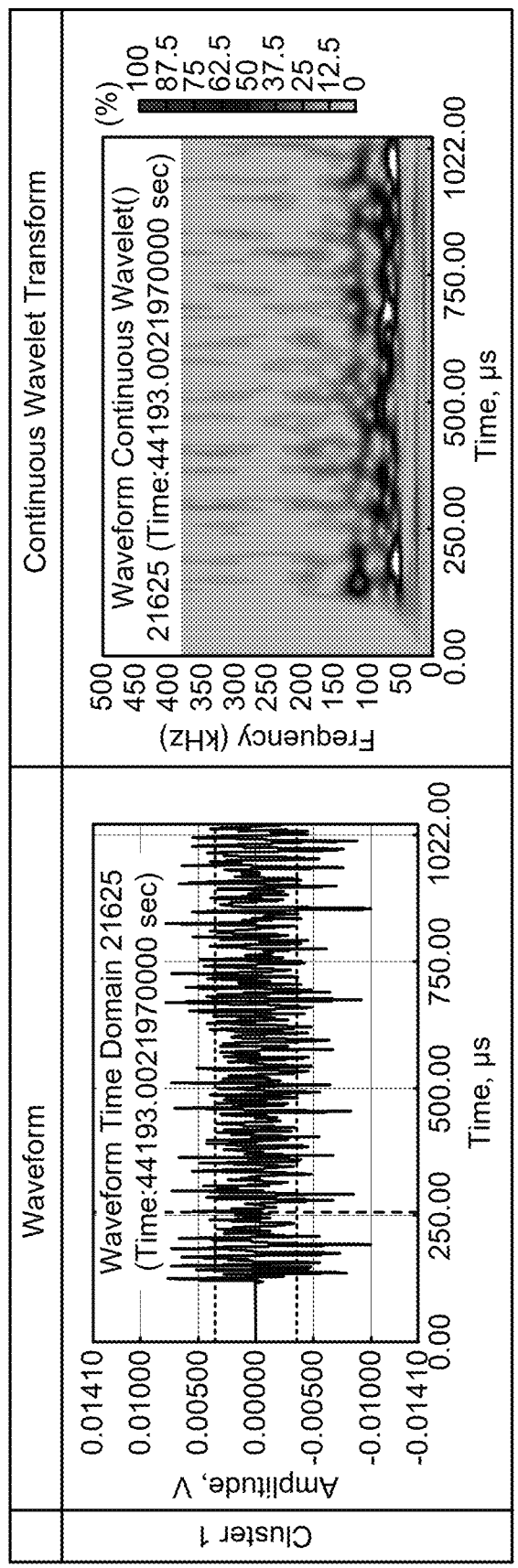
Figure 6C:
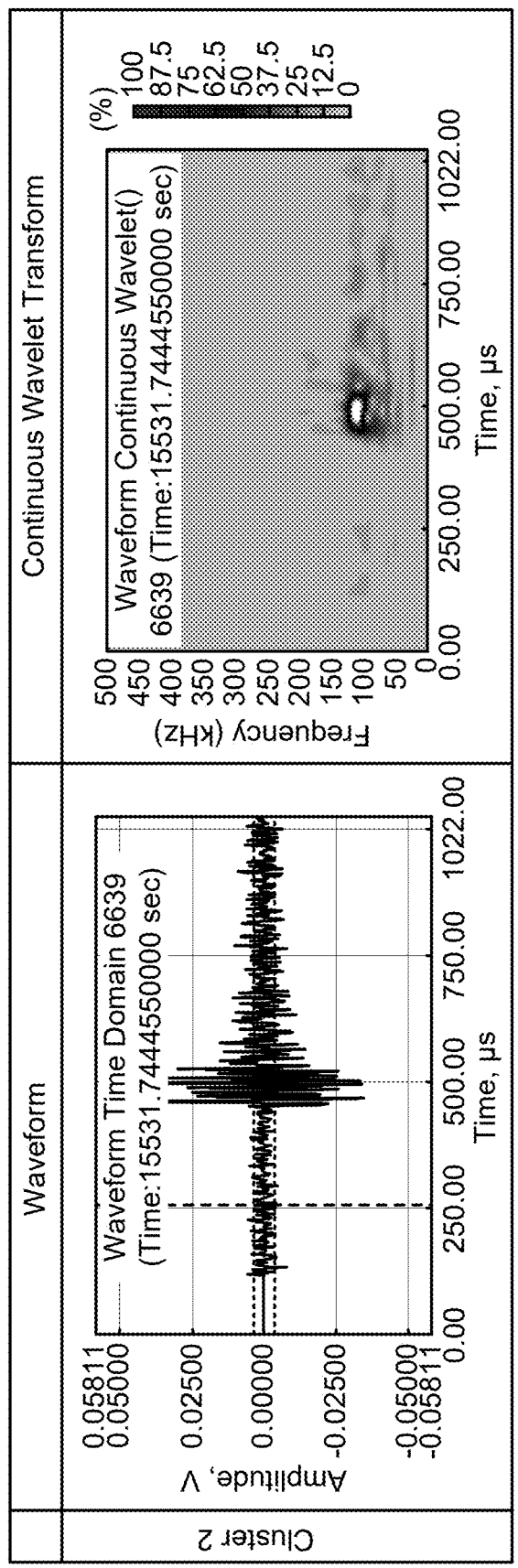
Figure 7:
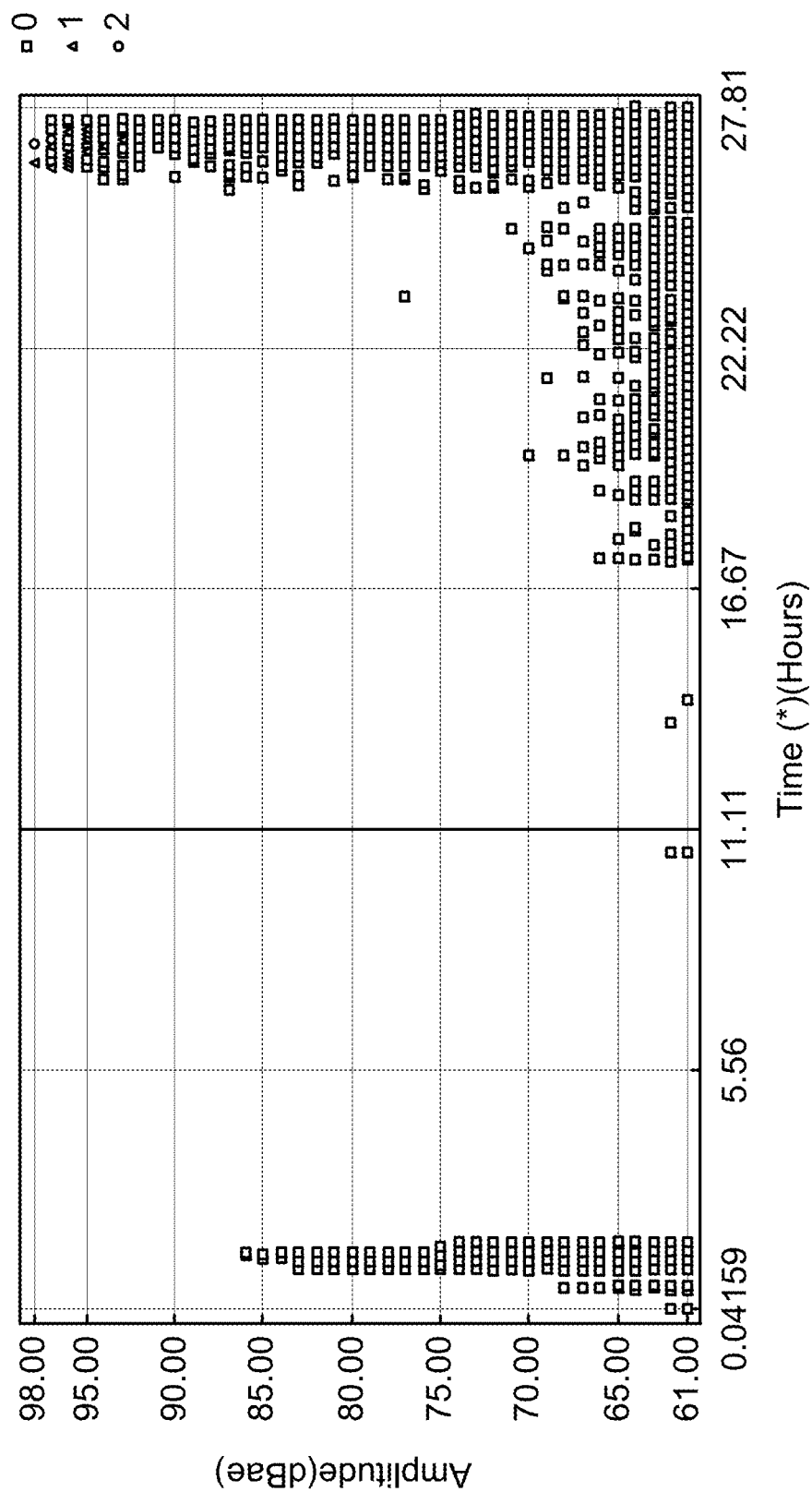
FIG. 7 shows the results of Test 1 amplitude versus time.
Figure 8:
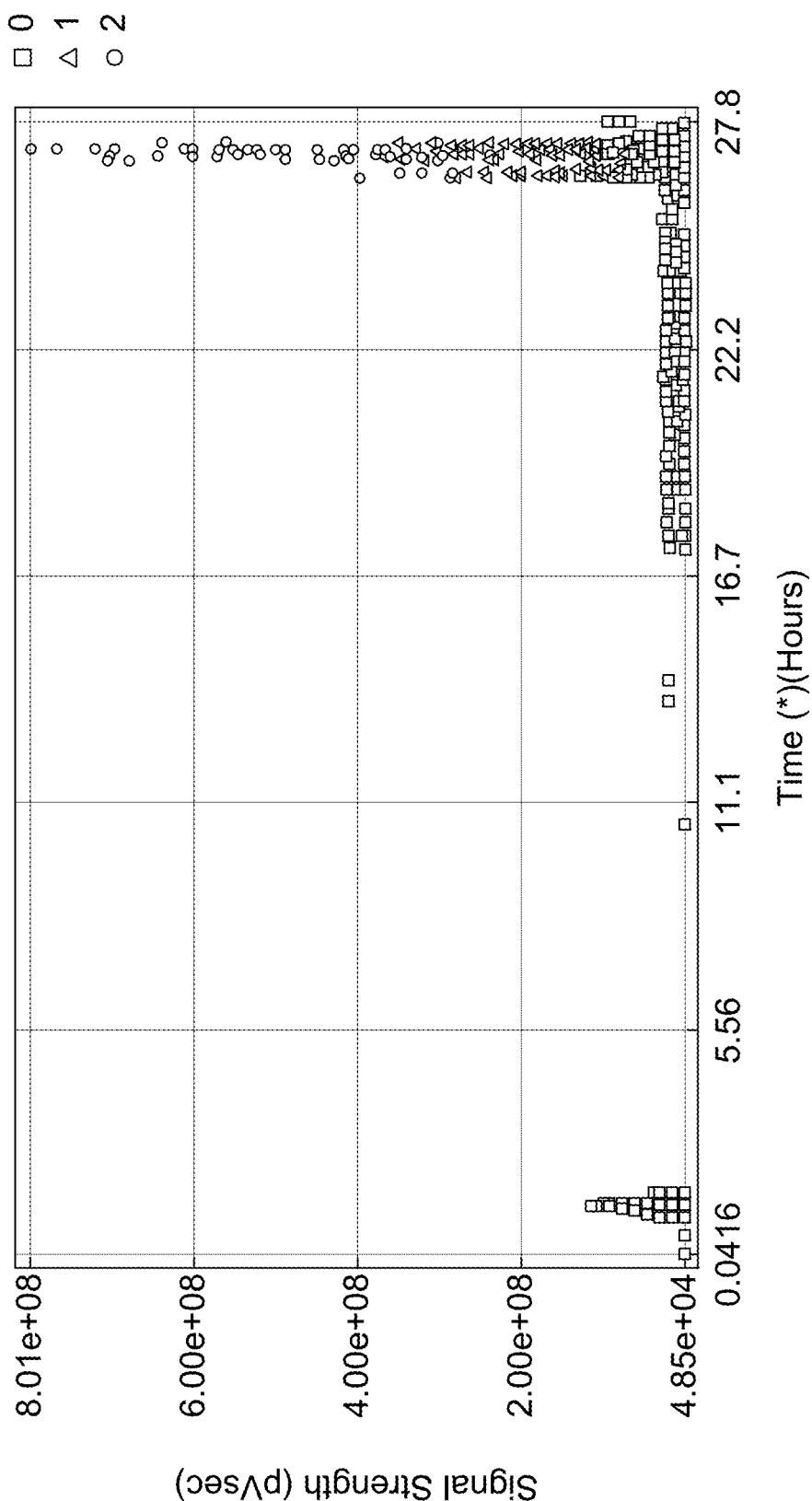
FIG. 8 shows the results of Test 1, signal strength versus time.
Figure 9:
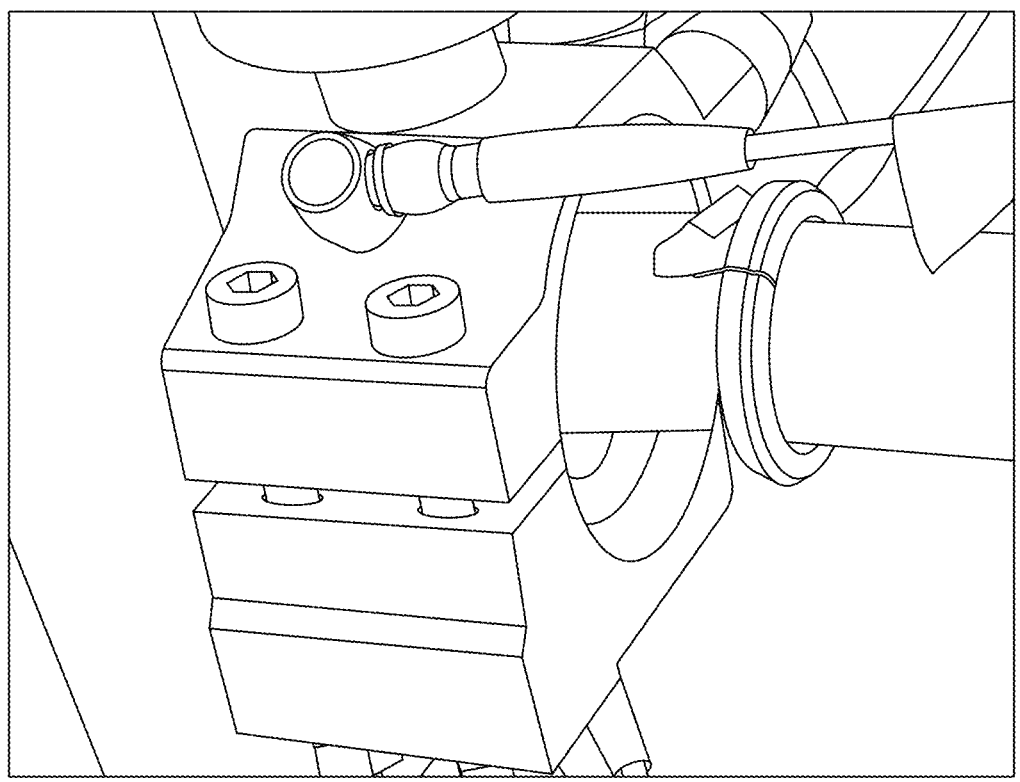
FIG. 9 shows a photograph of damage, square inset, to the bearing being tested.
Figure 10:
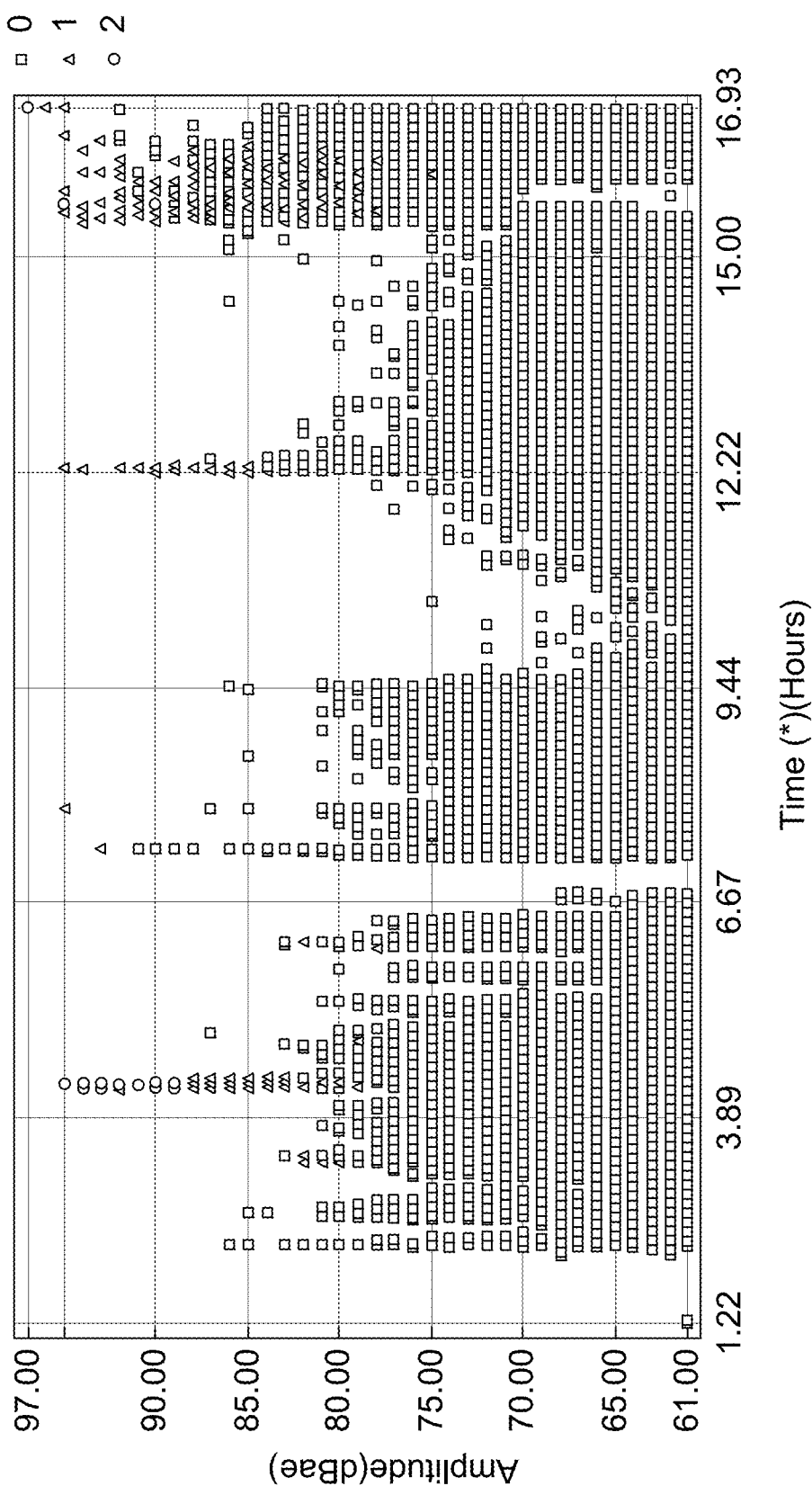
FIG. 10 shows the results of Test 2, Amplitude versus Time.
Figure 11:
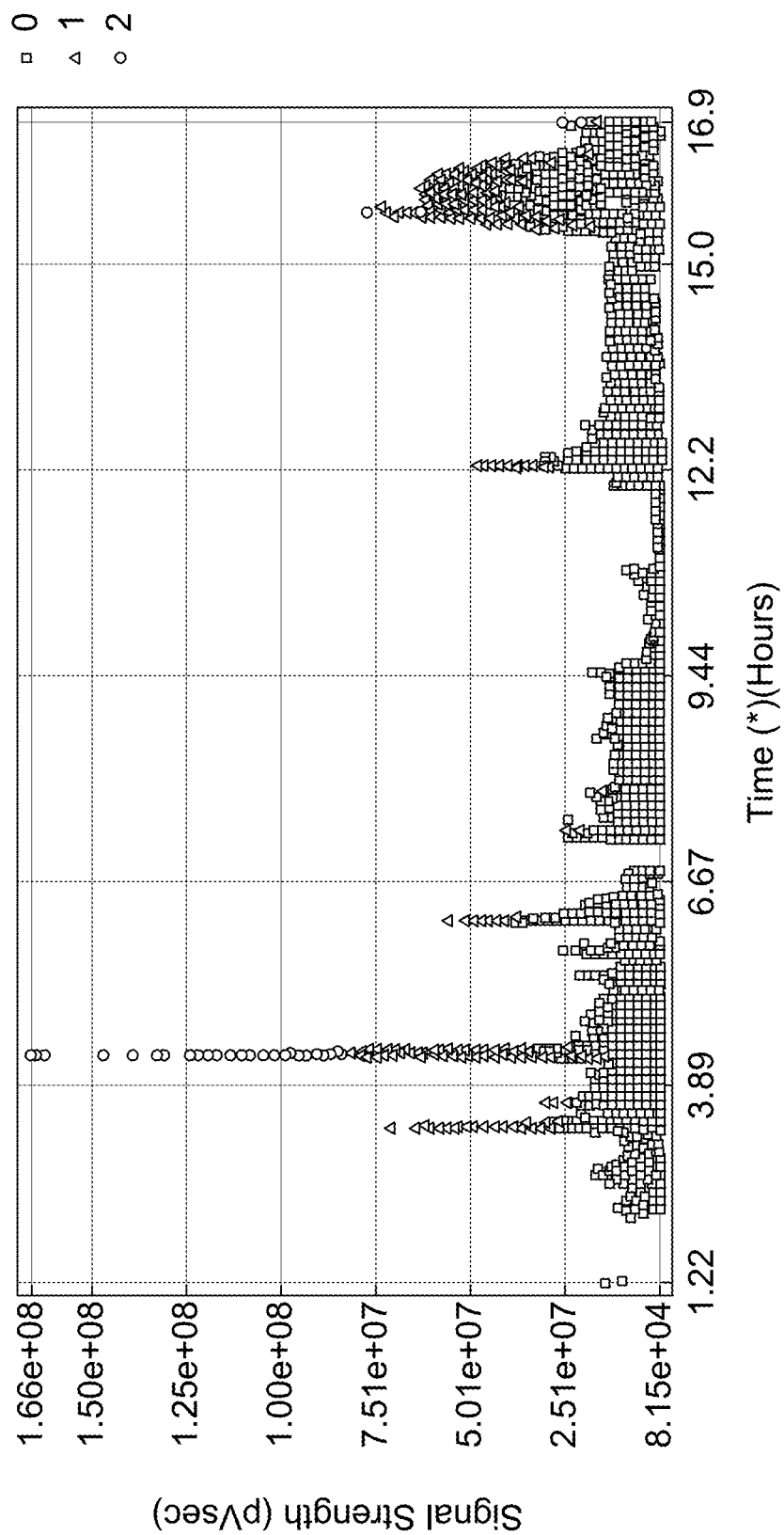
FIG. 11 shows the results of Test 2, signal strength versus time.
Figure 12:
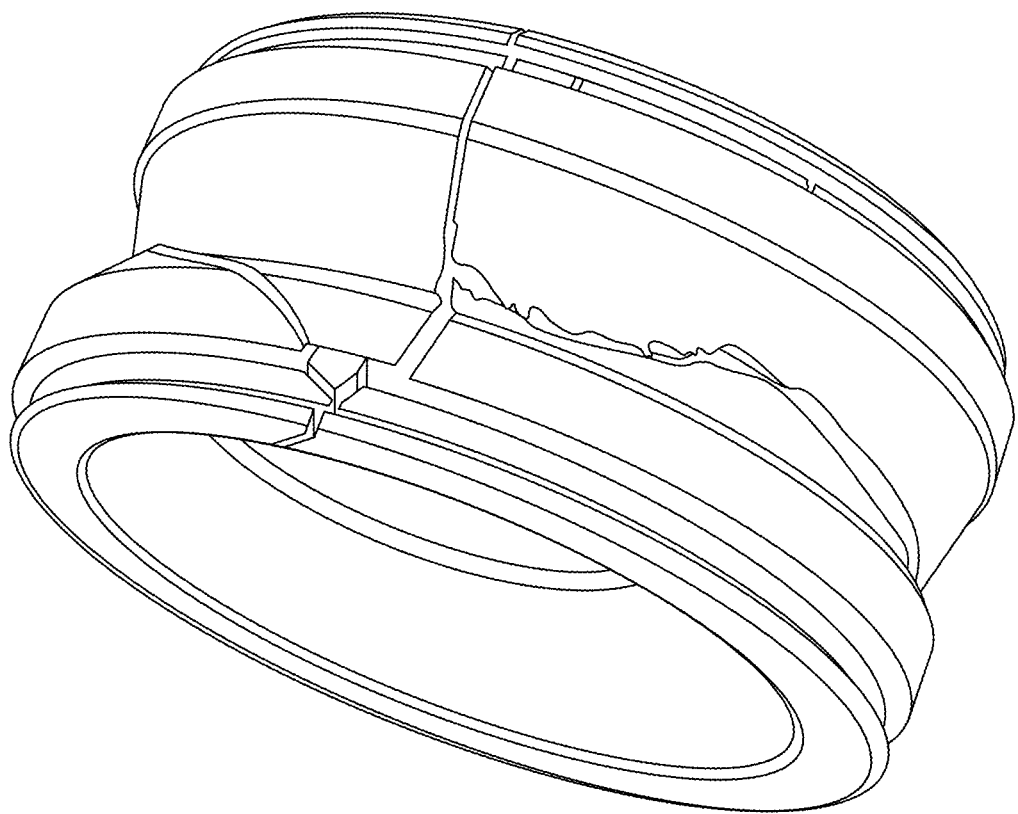
FIG. 12 shows a photograph of the tested bearing and damage to its structure.
Figure 13:
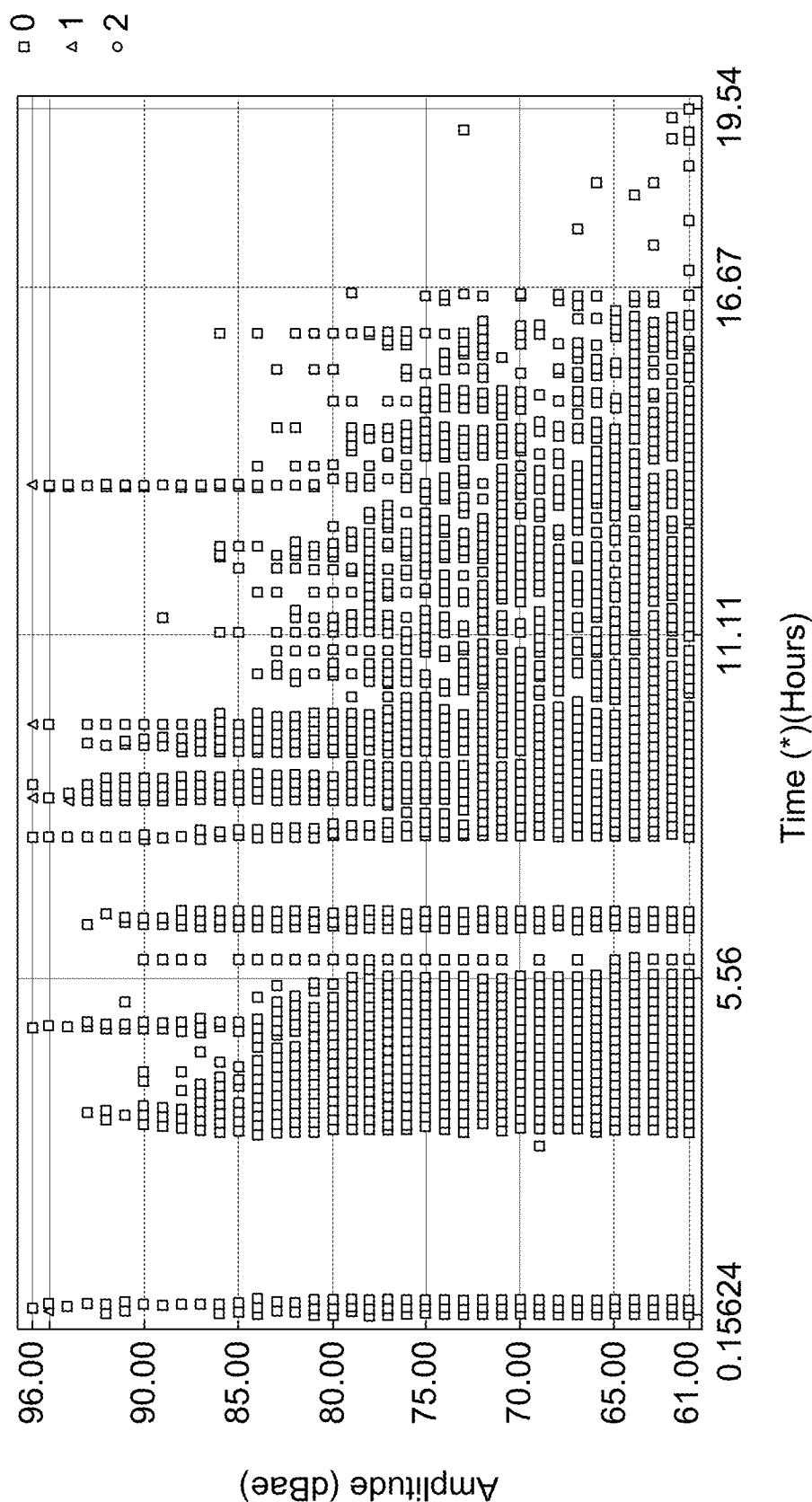
FIG. 13 shows the results of Test 3, Amplitude versus Time.
Figure 14:
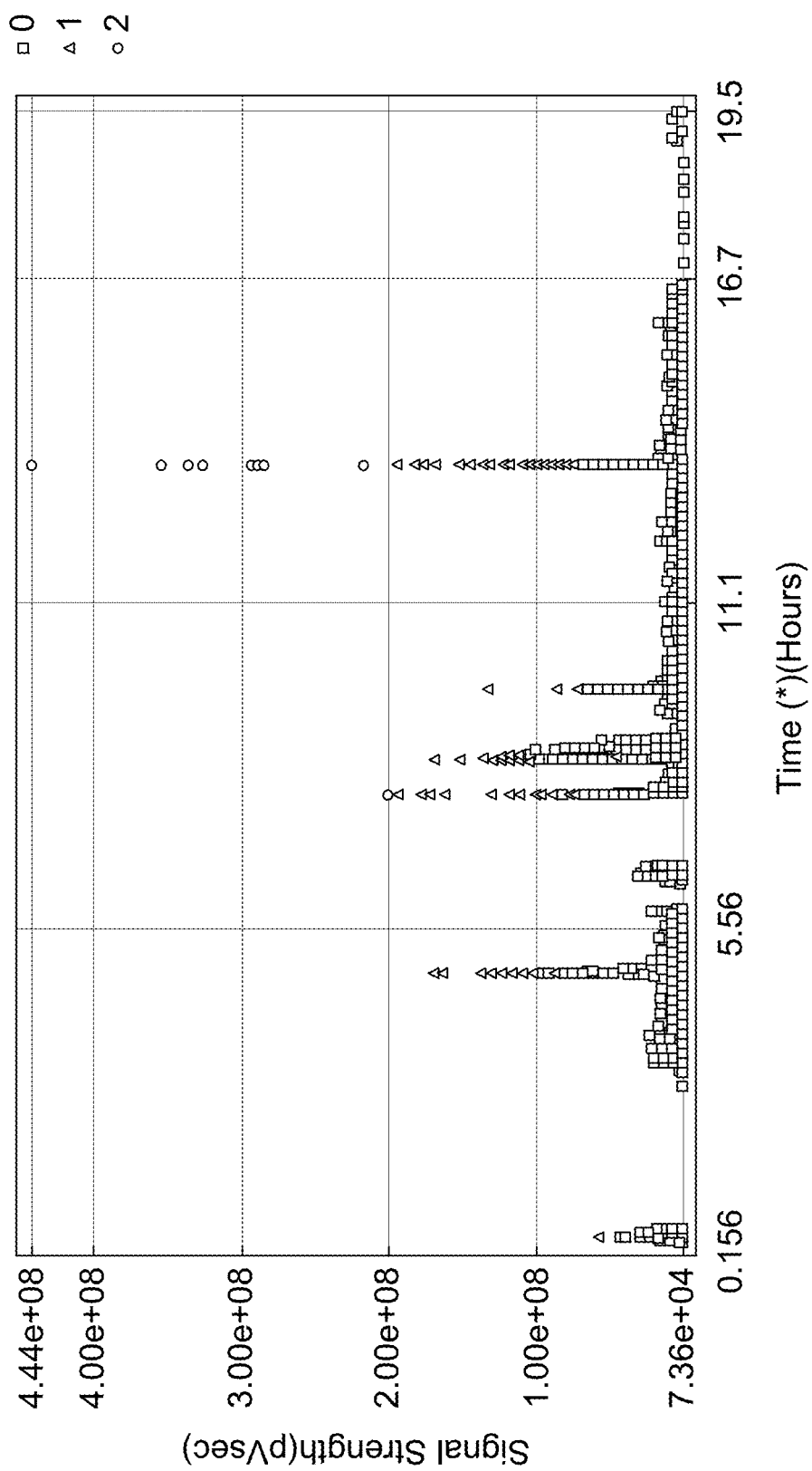
FIG. 14 shows the results of Test 3, signal strength versus time. Test 3 was stopped prematurely due to loud noise emission.
Figure 15:
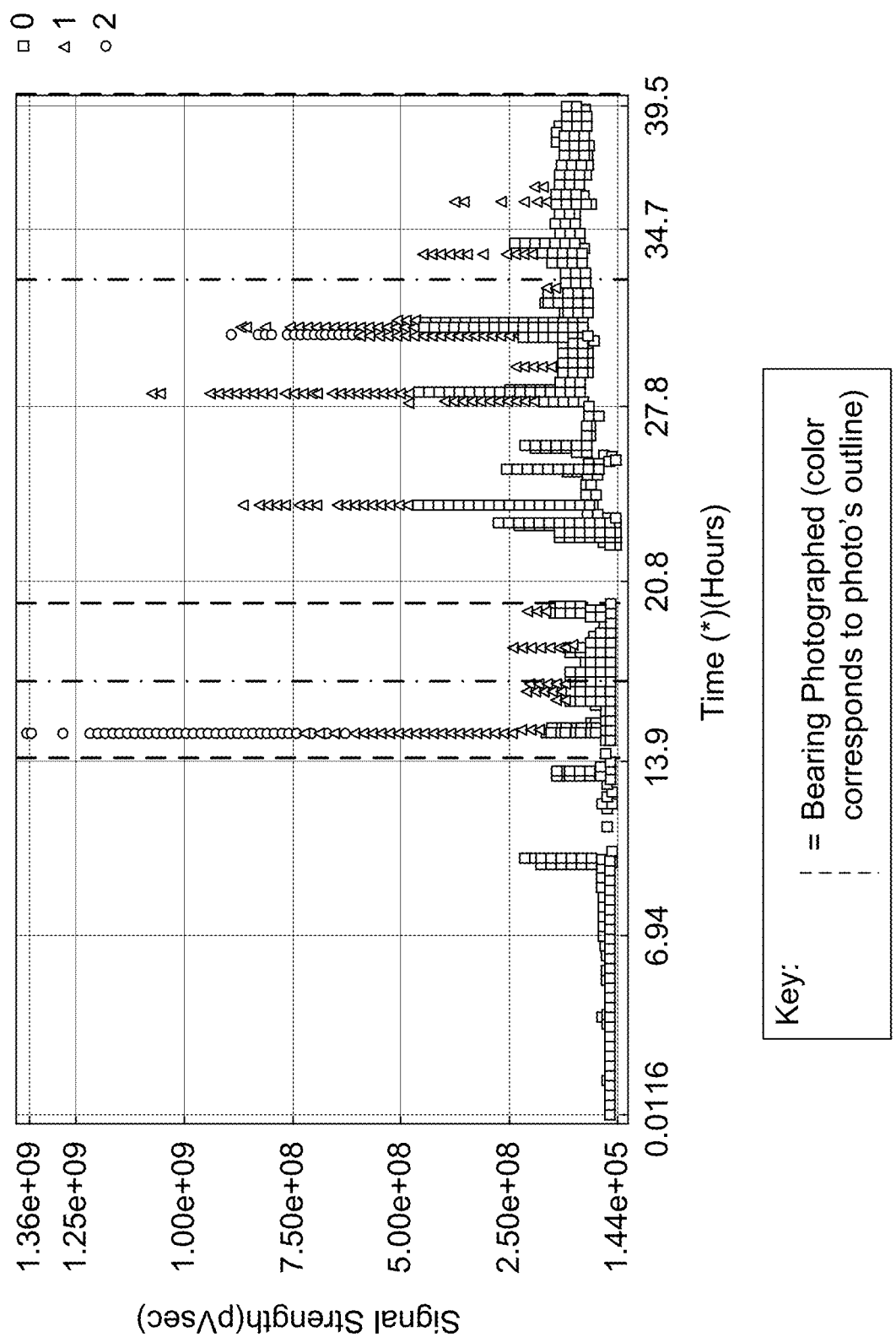
FIG. 15 shows the results of Test 4.
Figure 16:
Figure 17:
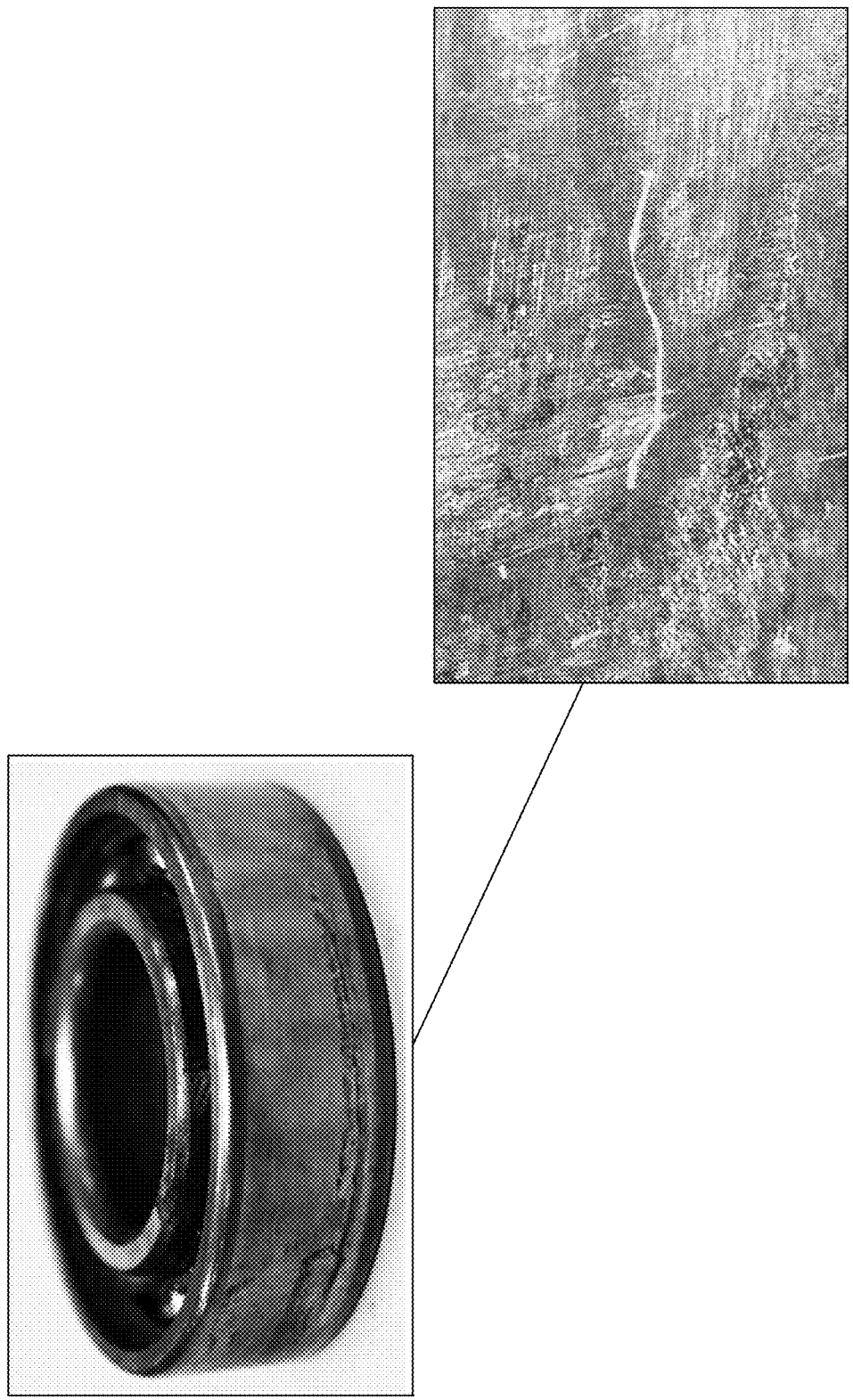
Figure 19:
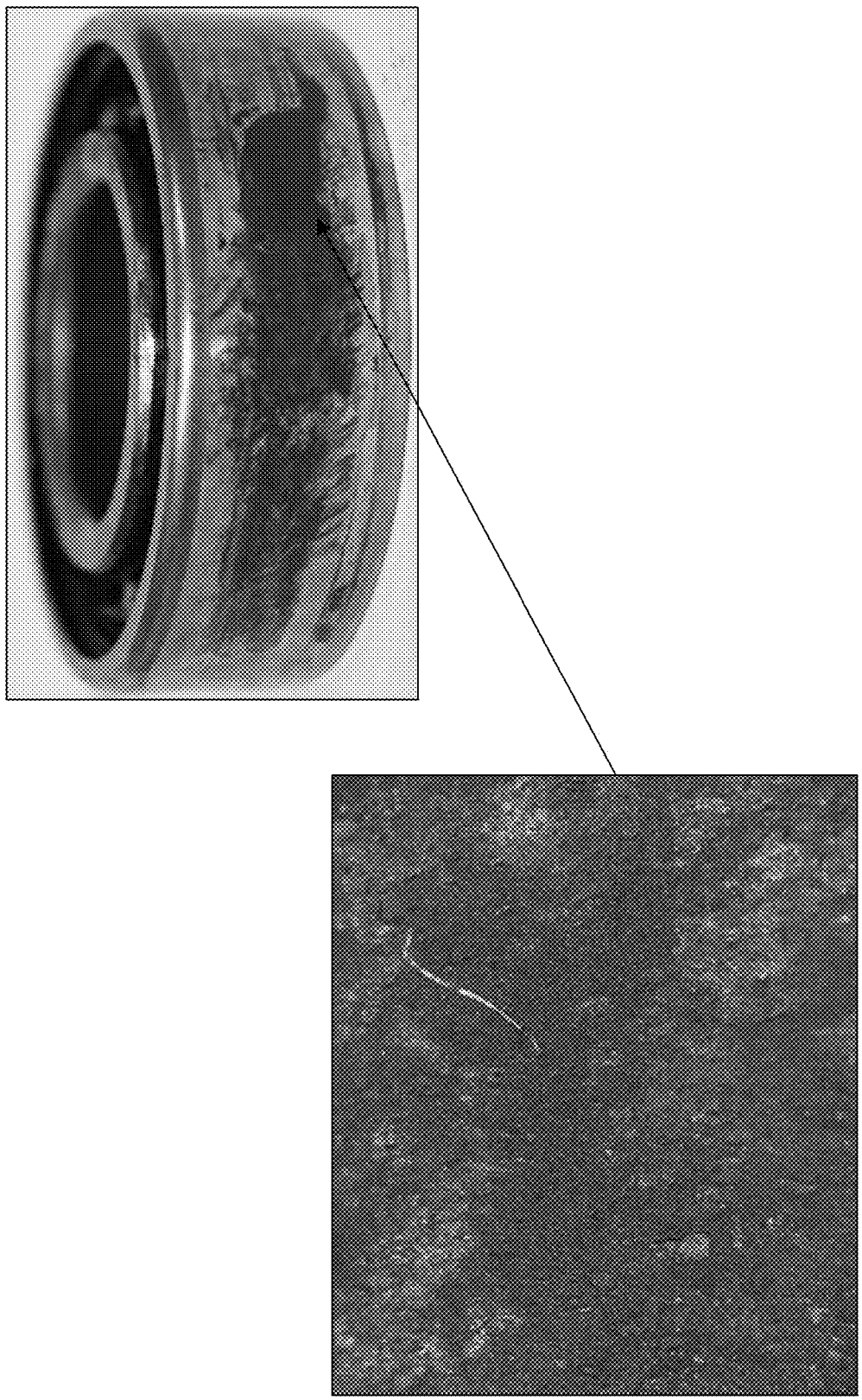
Figure 20:
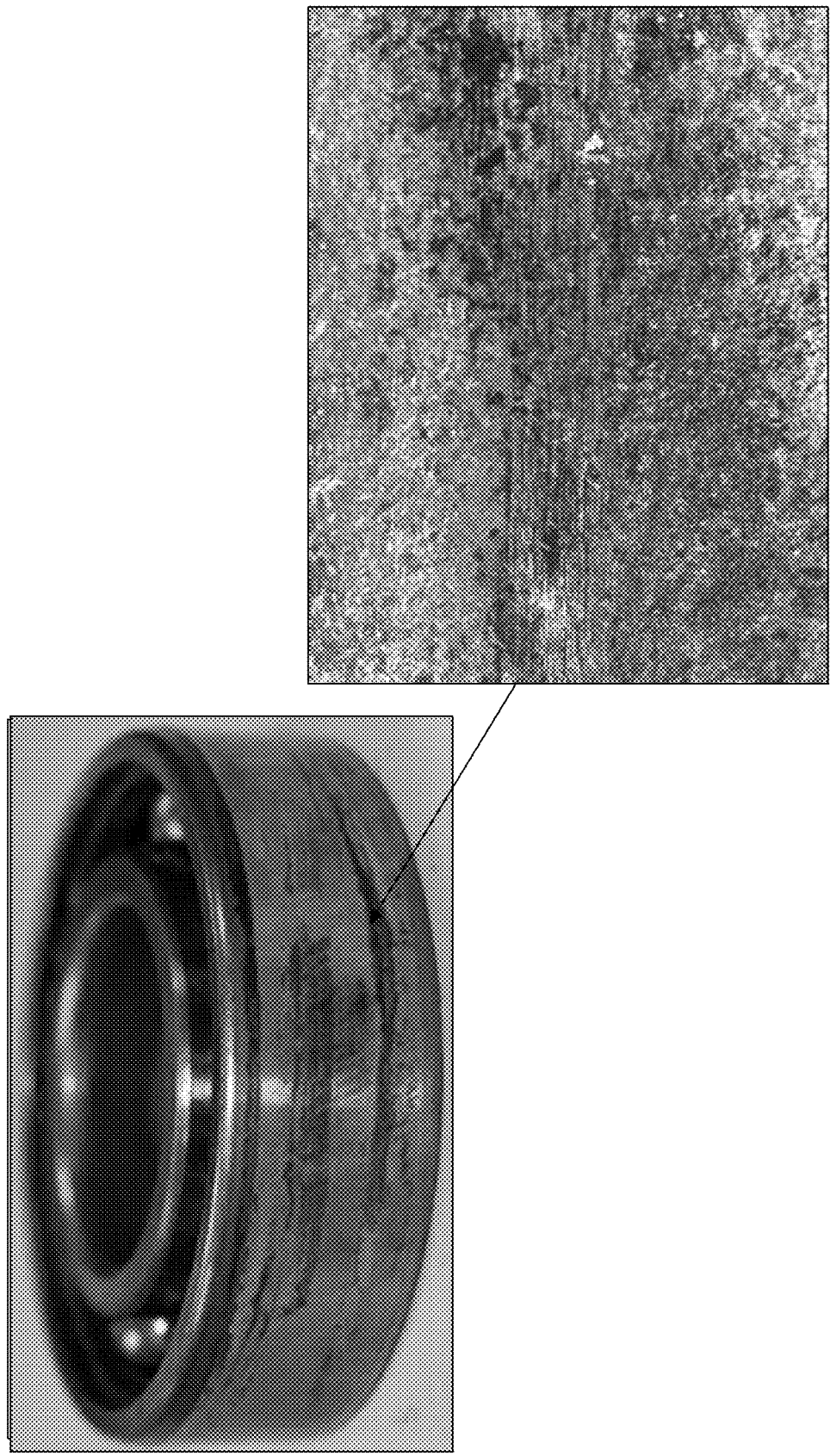

Analysis was accomplished through NOESIS (Acoustic Emission Data Analysis Pattern Recognition and Neural Network Software). The lowest correlated features were selected for pattern recognition, some of those being:
Rise Time
Amplitude
Energy
Average Frequency
Clustering Method: K-means unsupervised FIG. 6 shows Cluster 1, Cluster 2, and Cluster three comparing amplitude versus time for waveform and continuous wavelet transform. FIG. 7 shows the results of Test 1 amplitude versus time. FIG. 8 shows the results of Test 1, signal strength versus time. FIG. 9 shows a photograph of damage, square inset, to the bearing being tested. FIG. 10 shows the results of Test 2, Amplitude versus Time. FIG. 11 shows the results of Test 2, signal strength versus time. FIG. 12 shows a photograph of the tested bearing and damage to its structure. FIG. 13 shows the results of Test 3, Amplitude versus Time. FIG. 14 shows the results of Test 3, signal strength versus time. Test 3 was stopped prematurely due to loud noise emission. Minor damage was found to the runners but the balls looked to have minute defects. FIG. 15 shows the results of Test 4. Five different bearings, shown in FIGS. 16-20, were tested and the damage to each bearing shown offset. FIG. 16 shows bearing 1600, FIG. 17 shows bearing 1700, FIG. 18 shows bearing 1800, FIG. 19 shows bearing 1900, and FIG. 20 shows bearing 2000.

Analysis

Figure 21:
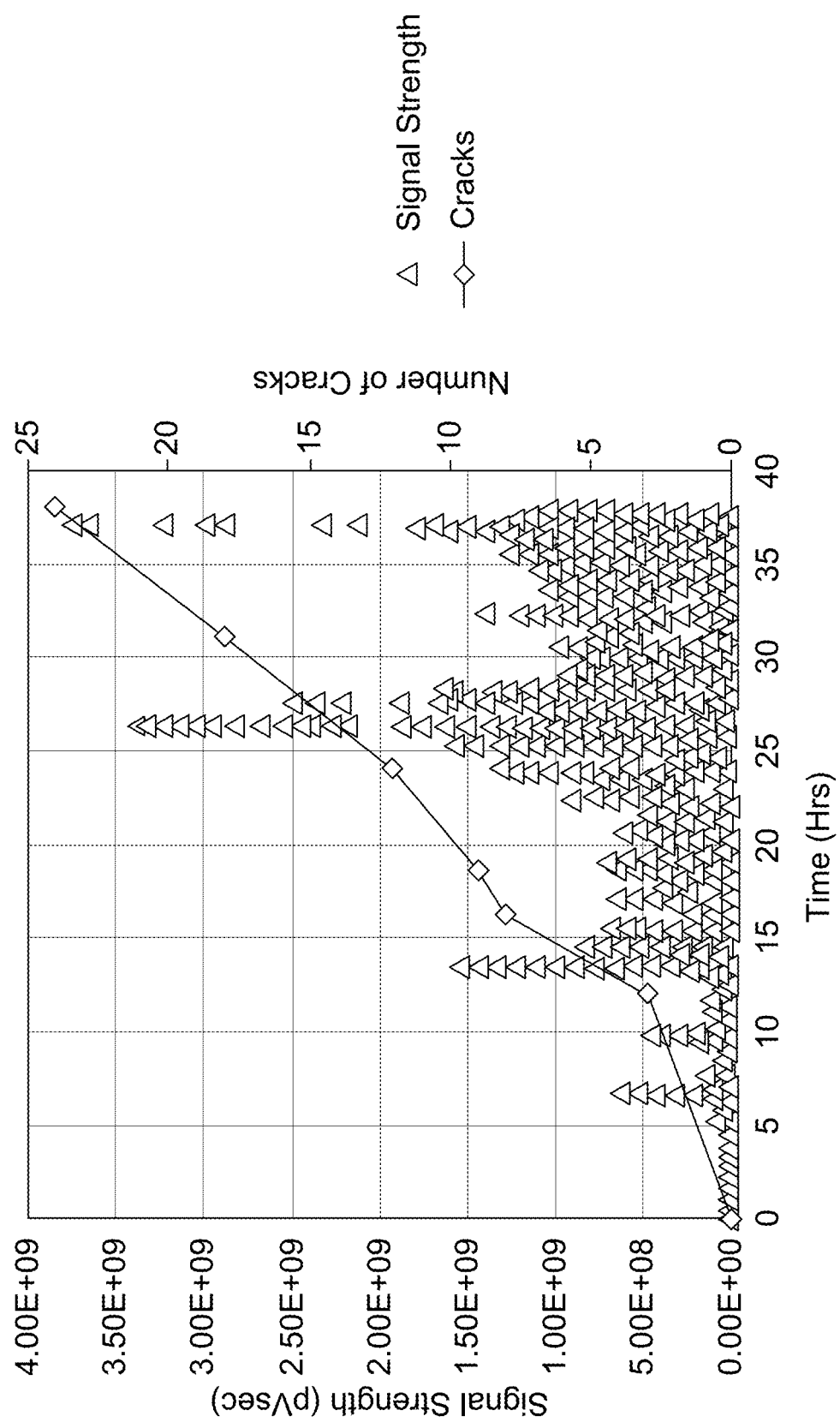
FIG. 21 shows the crack analysis of Test 4.
Figure 22A:
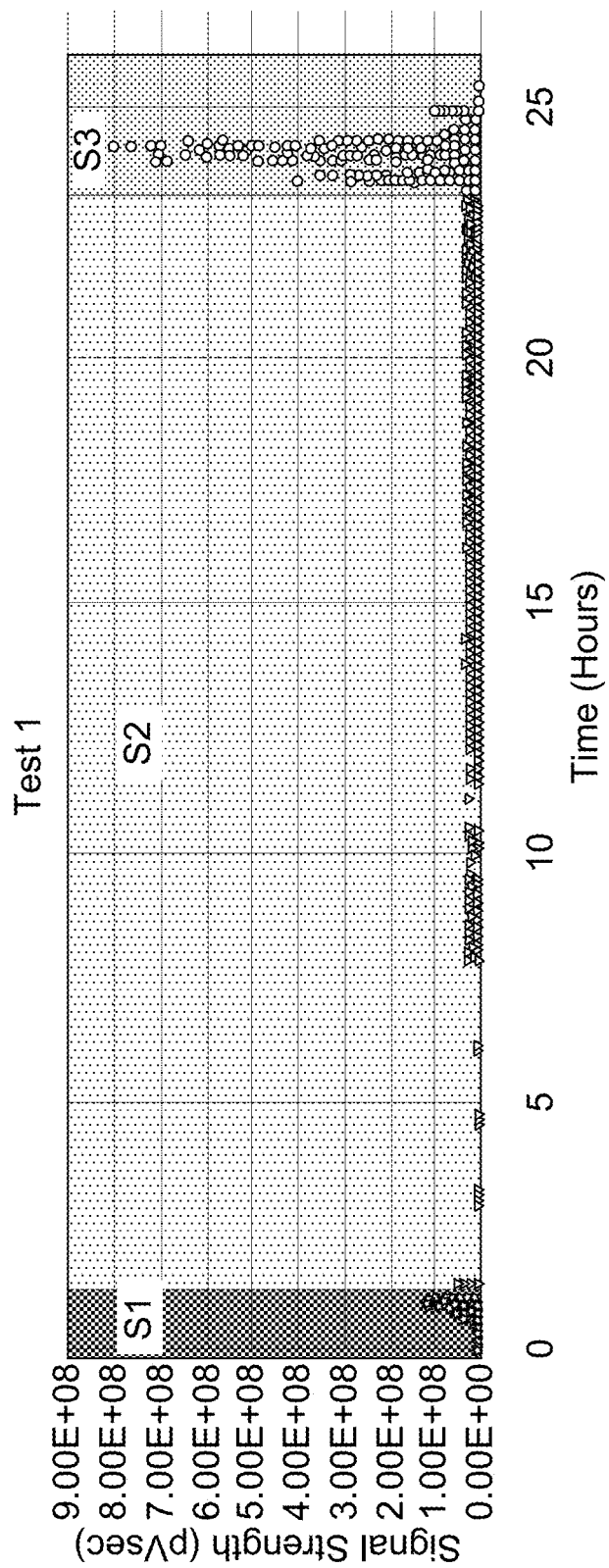
FIG. 22 shows signal strength separation for Tests 1-4.
Figure 22B:
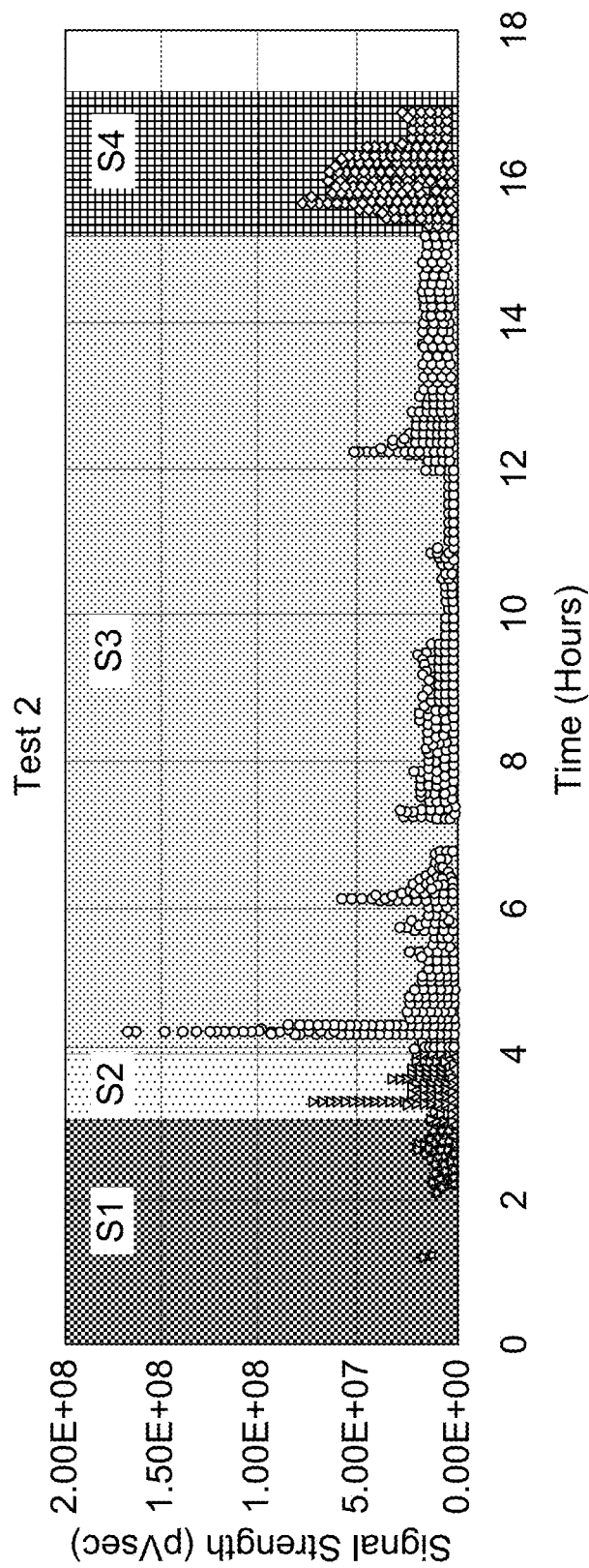
Figure 22C:
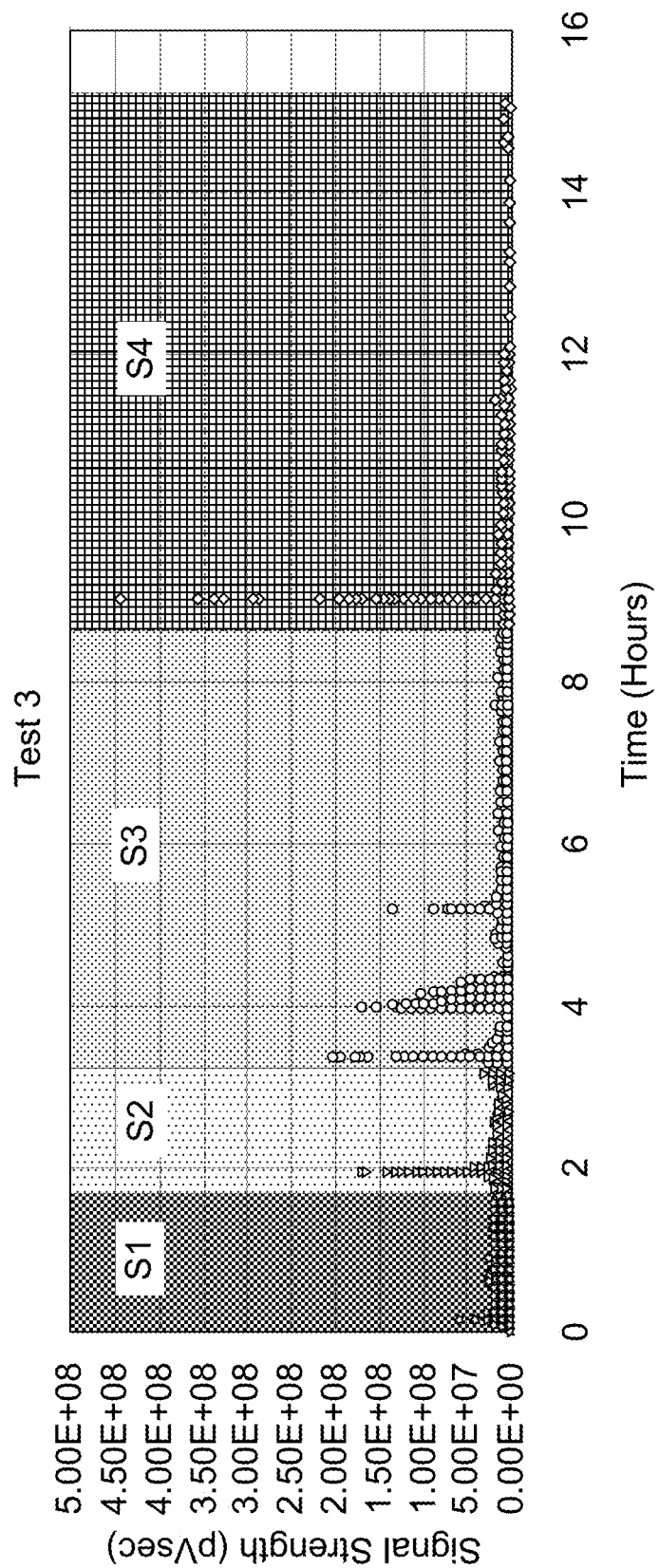
Figure 22D:
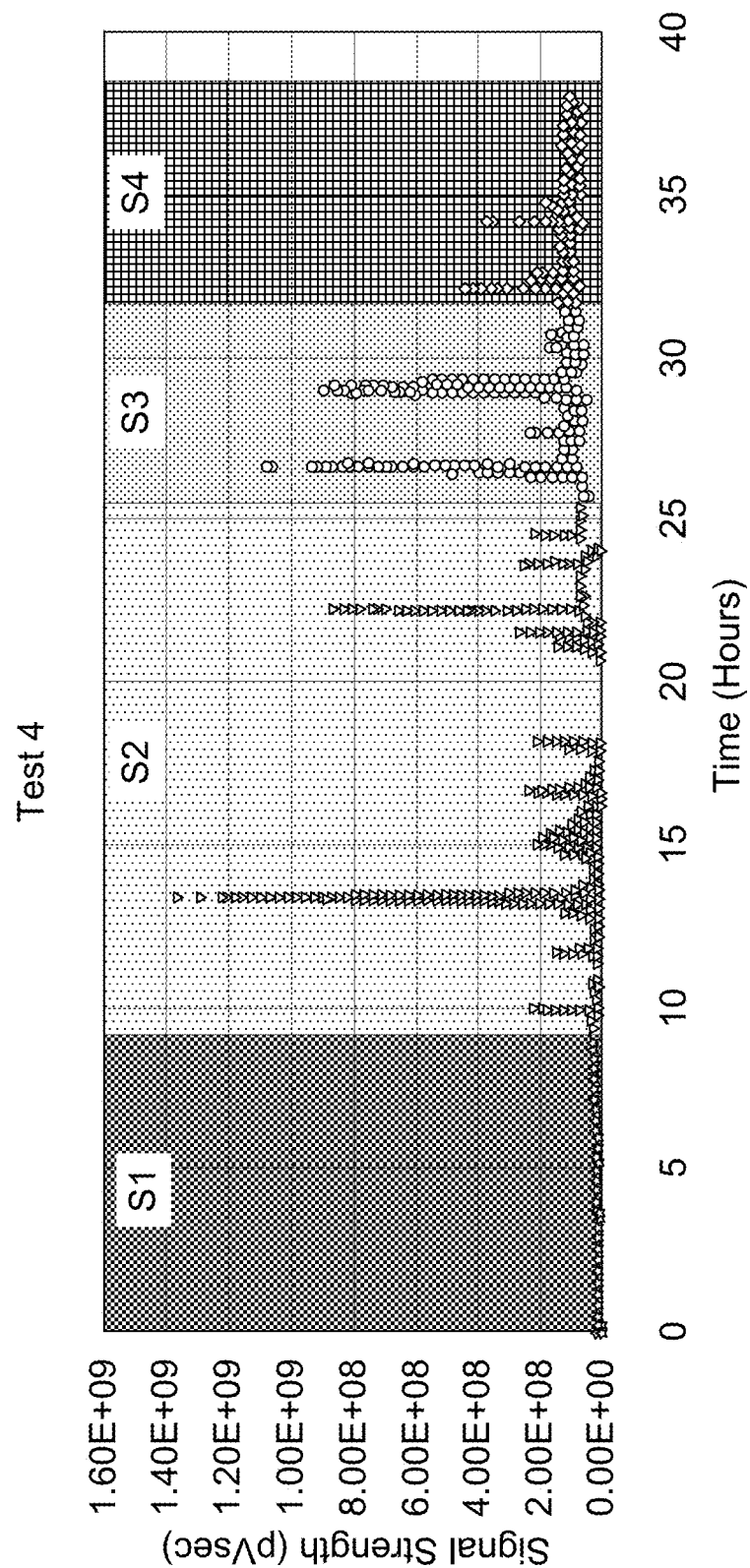
Figure 23:
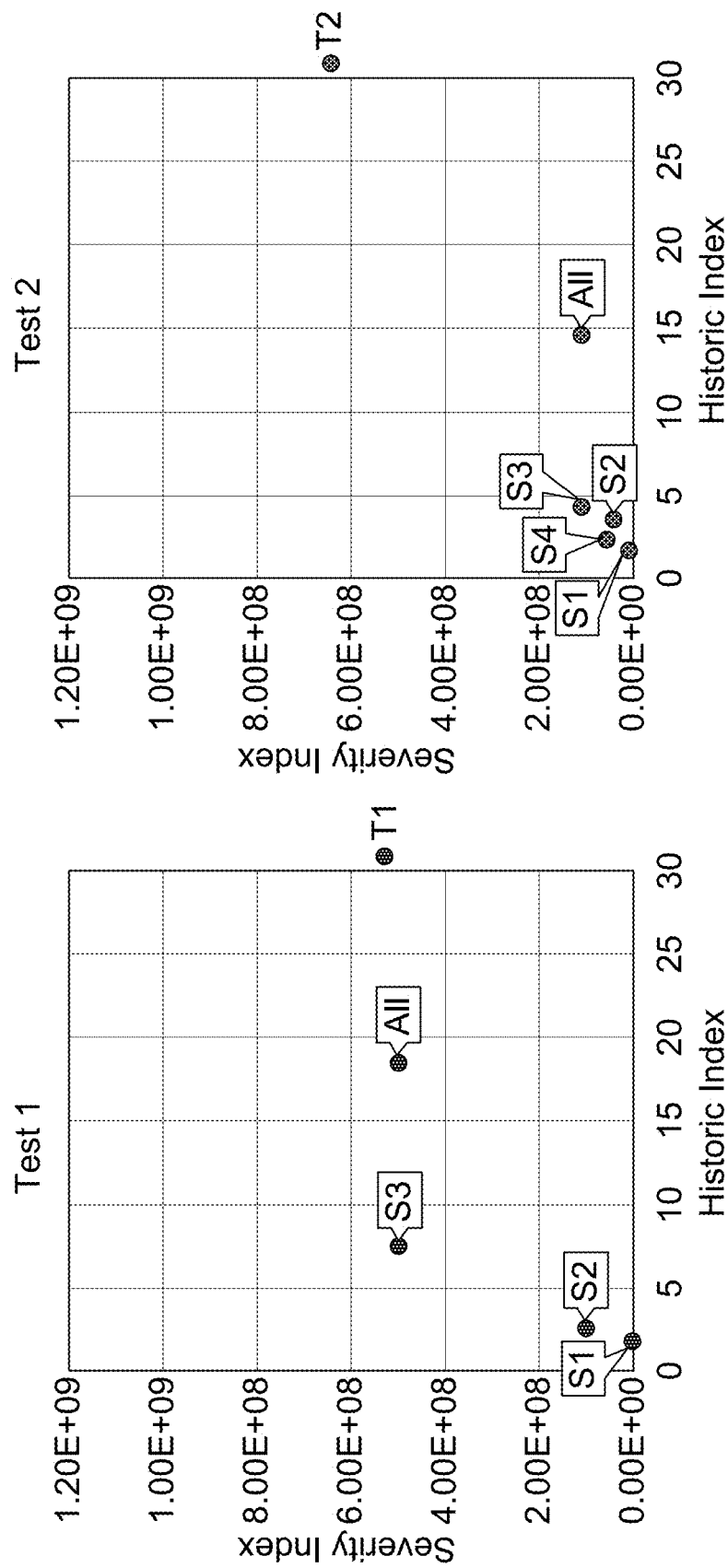
FIG. 23 shows intensity plots for Test 1 and Test 2.
Figure 24:
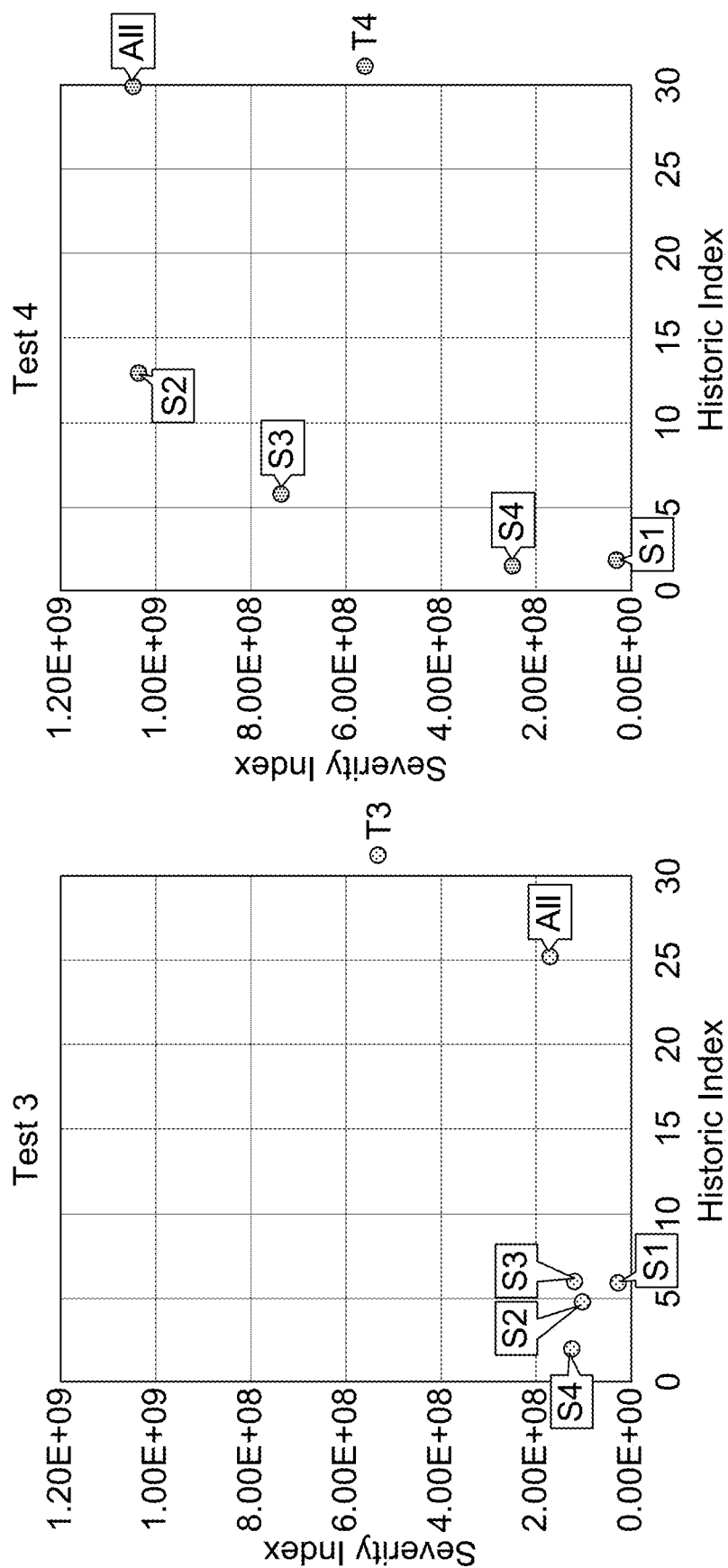
FIG. 24 shows intensity plots for Test 3 and Test 4.
Figure 25:
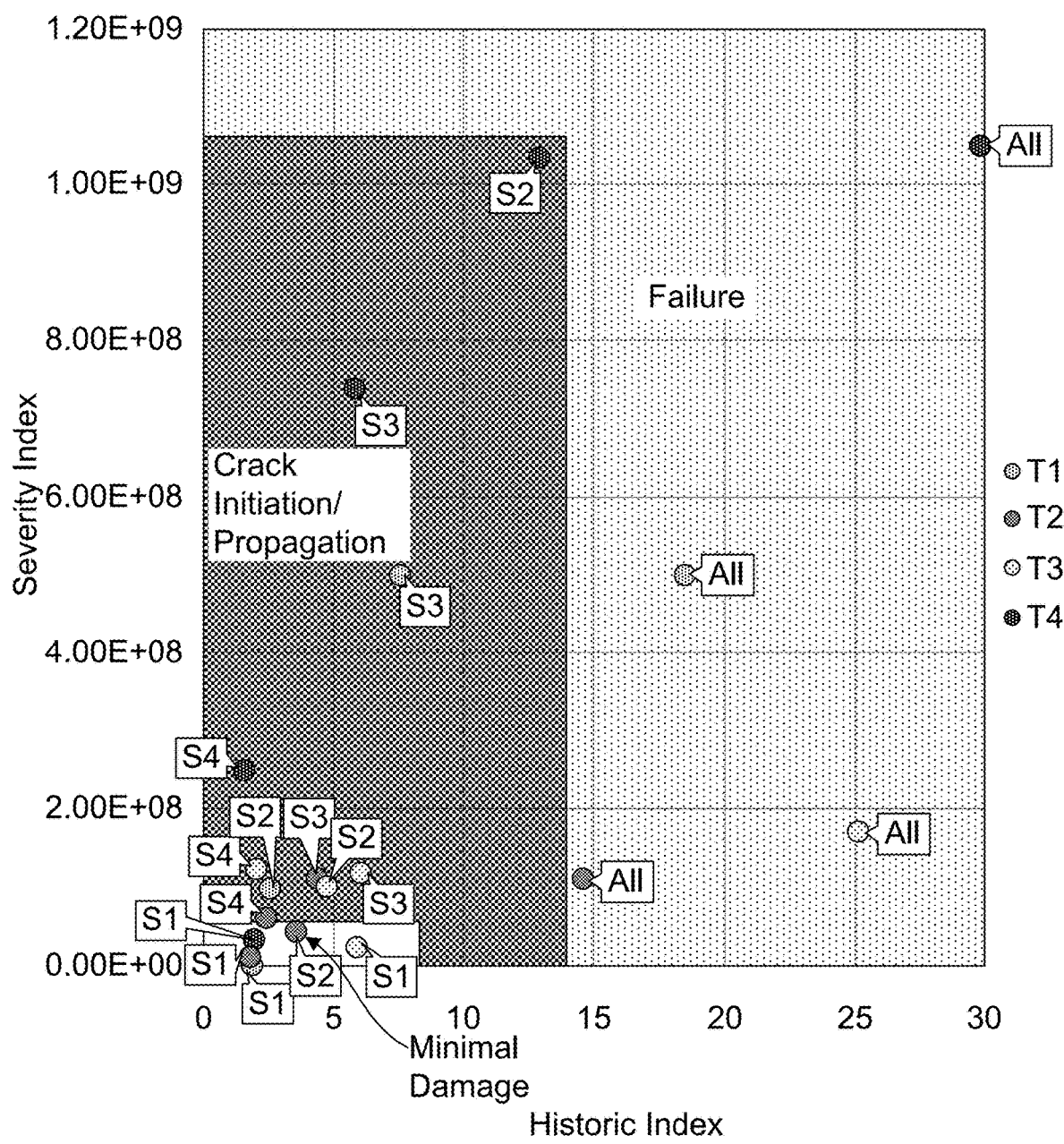
FIG. 25 shows an intensity plot comparison for Tests 1-4.
Figure 26:
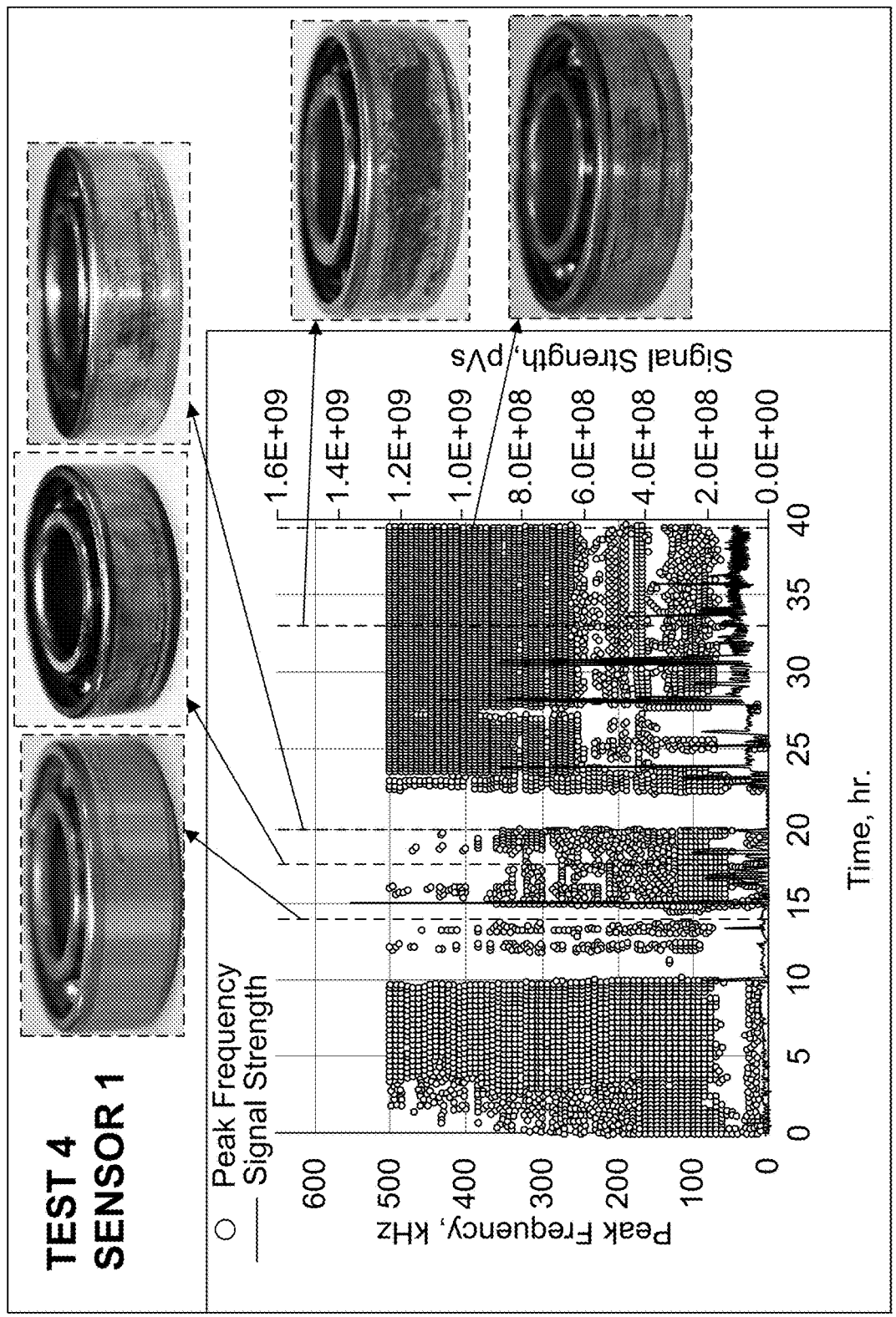
FIG. 26 shows data and photos of respective bearings from Test 4, Sensor 1.
Figure 27:
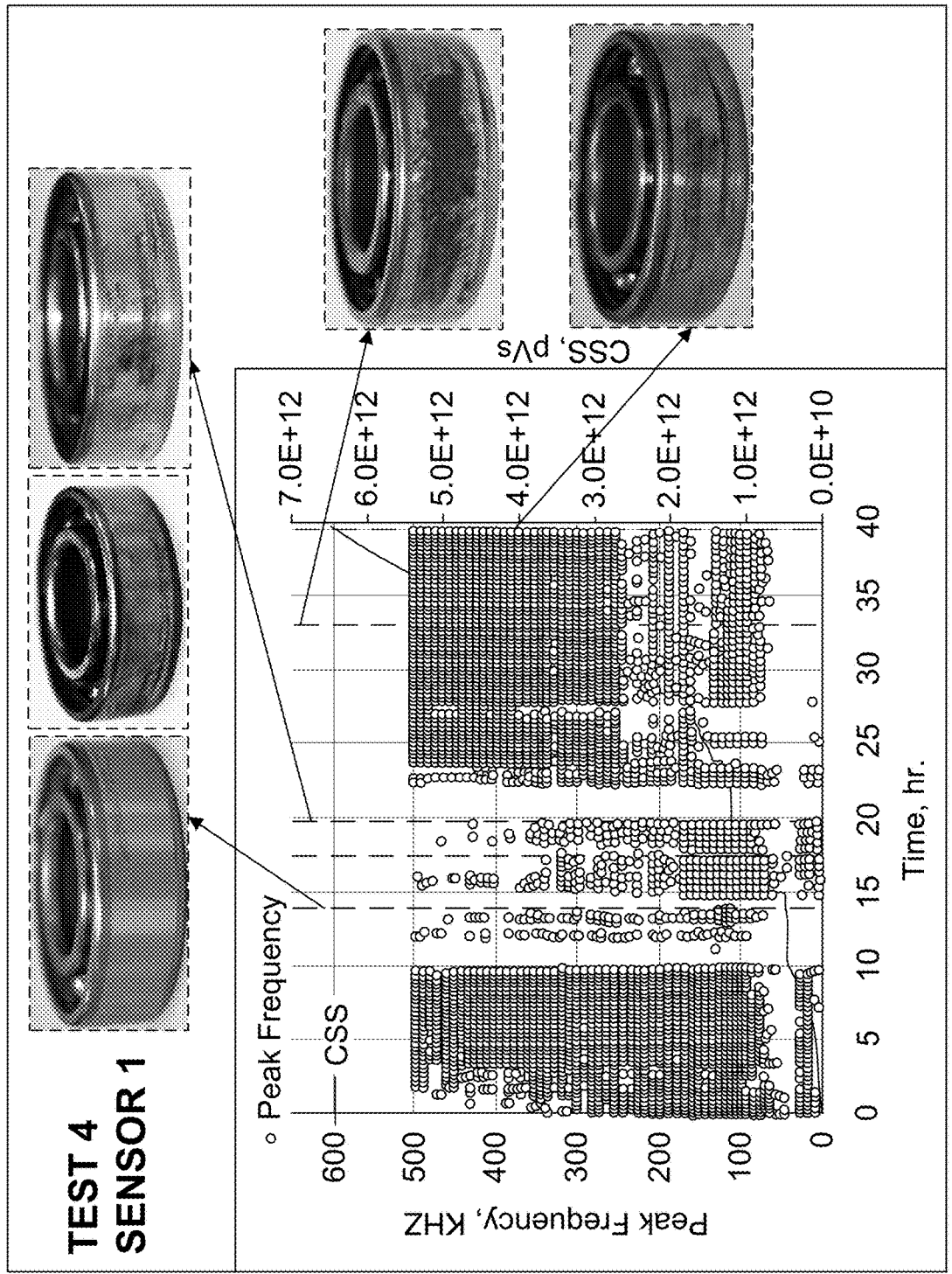
FIG. 27 shows a slope curve plotted on the information shown in FIG. 26.
Figure 28:
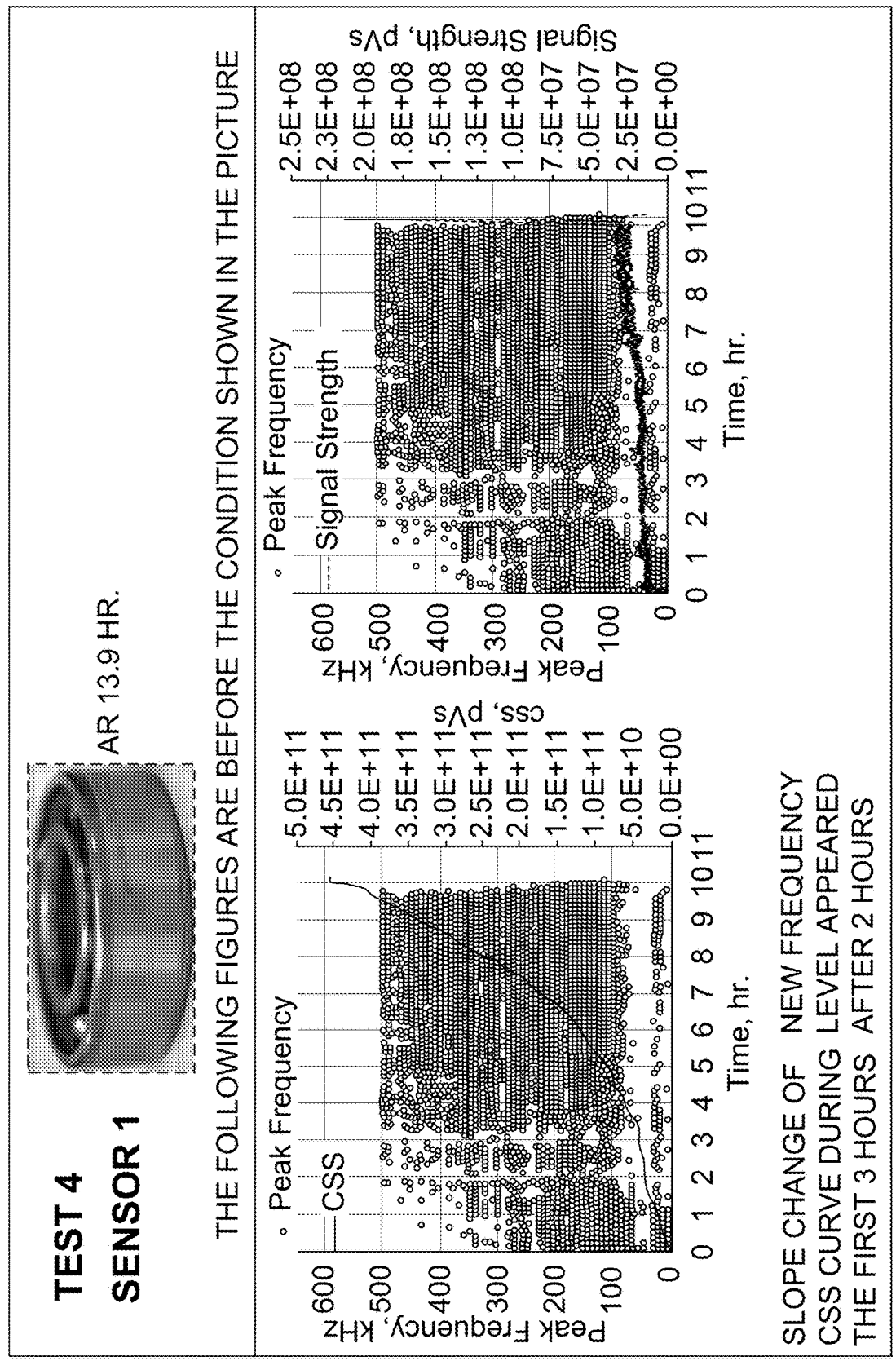
FIG. 28 shows a frequency development during Test 4 received from Sensor 1.
Figure 29:
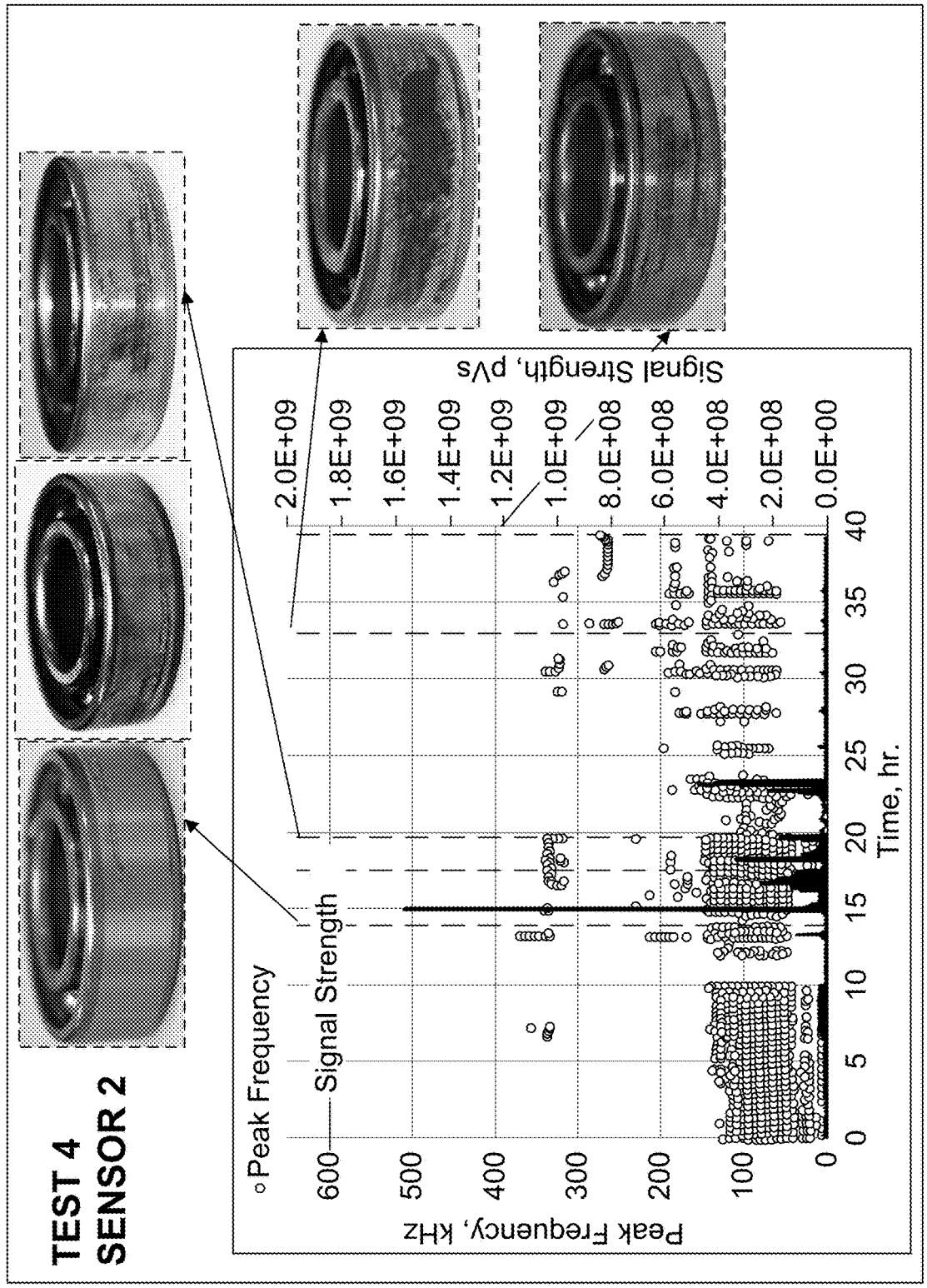
FIG. 29 shows data and photos of respective bearing from Test 4, Sensor 2.
Figure 30:
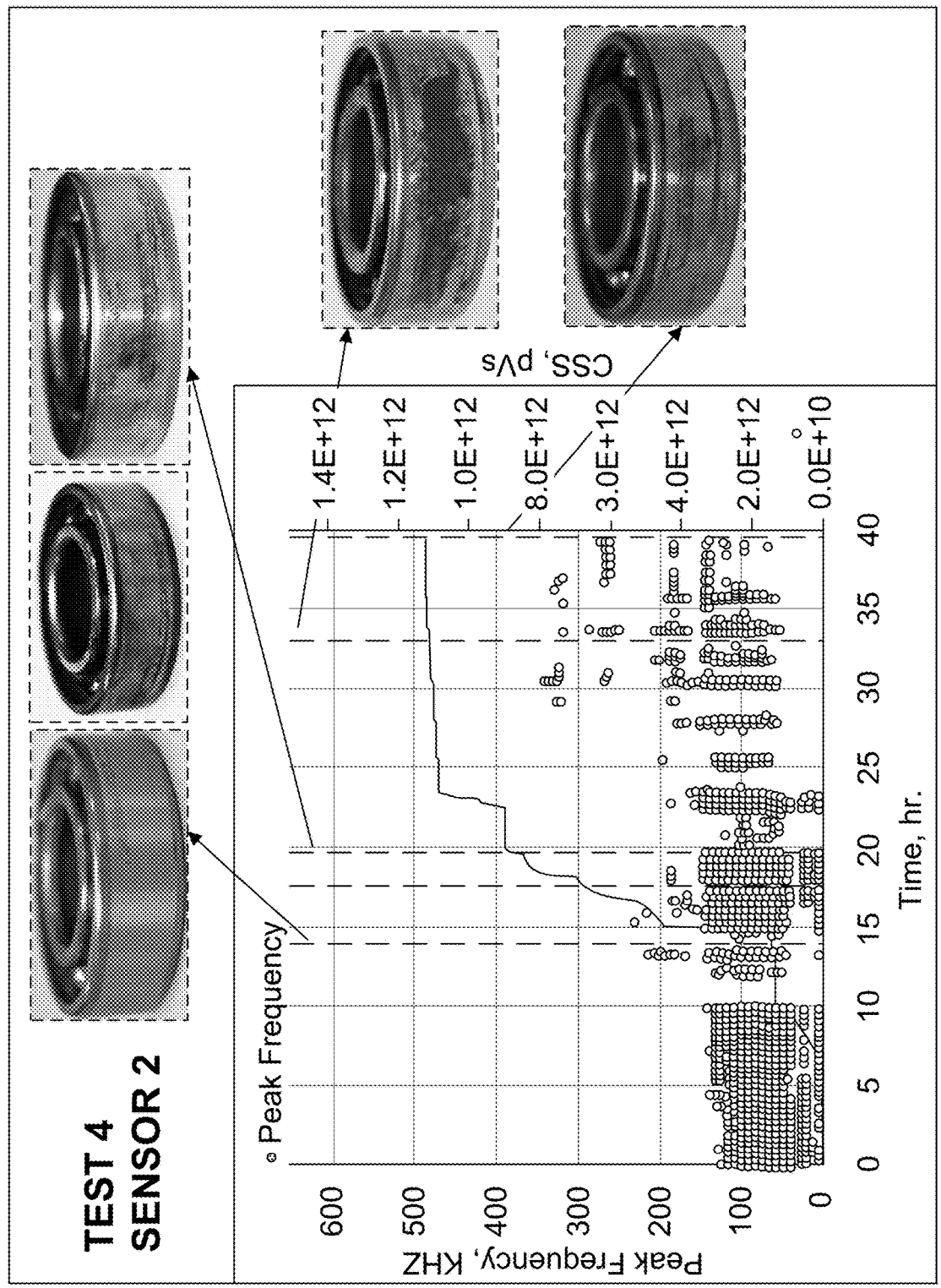
FIG. 30 shows a slope curve plotted on the information shown in FIG. 29.
Figure 31:
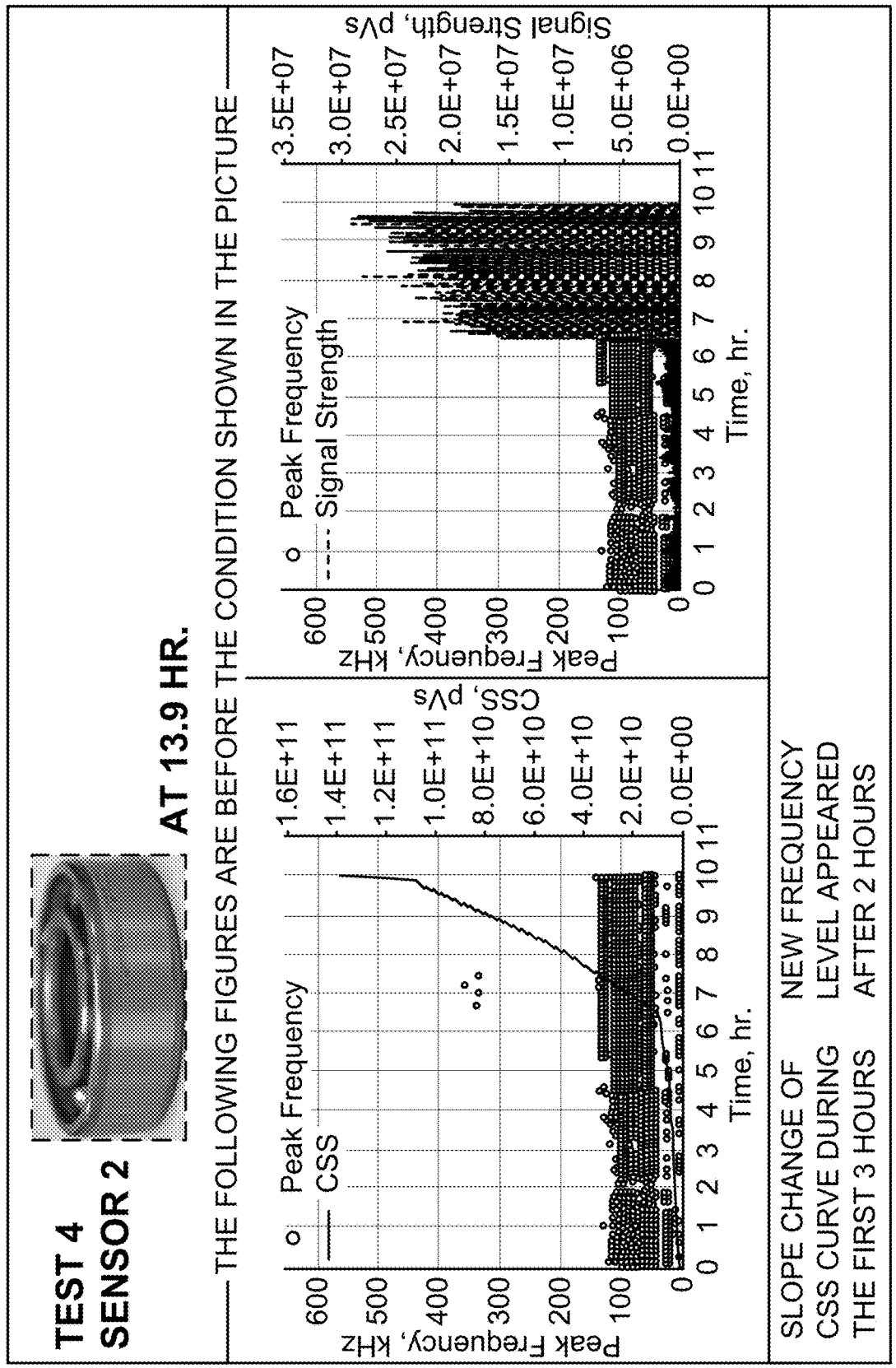
FIG. 31 shows a frequency development during Test 4 received from Sensor 2.

FIG. 21 shows the crack analysis of Test 4. FIG. 22 shows signal strength separation for Tests 1-4. FIG. 23 shows intensity plots for Test 1 and Test 2. FIG. 24 shows intensity plots for Test 3 and Test 4. FIG. 25 shows an intensity plot comparison for Tests 1-4. FIG. 26 shows data and photos of respective bearings from Test 4, Sensor 1. FIG. 27 shows a slope curve plotted on the information shown in FIG. 26. FIG. 28 shows a frequency development during Test 4 received from Sensor 1. FIG. 29 shows data and photos of respective bearing from Test 4, Sensor 2. FIG. 30 shows a slope curve plotted on the information shown in FIG. 29. FIG. 31 shows a frequency development during Test 4 received from Sensor 2. Two acoustic emissions parameters, Cumulative Signal Strength (CSS) and Peak Frequency of Acoustic Emission Signal have been used to classify bearing damage.

CONCLUSIONS

The clustering method used successfully classified crack propagation. Useful AE parameters for classifying crack initiation and propagation are: amplitude (above 90 dB), initiation frequency (below 20000 kHz), absolute energy (above 1E7 J), frequency centroid (below 215 kHz), peak frequency (below 150 kHz), and signal strength (above 5E7 pVsec).

It was determined that the severity index and historic index at crack propagation is much higher than at the final section where failure occurred. AE is suitable for remote monitoring of bearing degradation. With the use of signal alarms based upon the clustering method and parameters discussed, one can be notified when a crack is initiating and propagating and prepare for failure of the bearing.

The current disclosure has been used to classify damage of four rolling element bearings tested in a specially made rotating machine test bed at various loads and rotation cycles to exemplify shipboard machinery operation at various depths. Applications for all rotating machinery including generators, military helicopters civilian helicopters, navy and other ships.

Various modifications and variations of the described methods, pharmaceutical compositions, and kits of the disclosure will be apparent to those skilled in the art without departing from the scope and spirit of the disclosure. Although the disclosure has been described in connection with specific embodiments, it will be understood that it is capable of further modifications and that the disclosure as claimed should not be unduly limited to such specific embodiments. Indeed, various modifications of the described modes for carrying out the disclosure that are obvious to those skilled in the art are intended to be within the scope of the disclosure. This application is intended to cover any variations, uses, or adaptations of the disclosure following, in general, the principles of the disclosure and including such departures from the present disclosure come within known customary practice within the art to which the disclosure pertains and may be applied to the essential features herein before set forth.

What is claimed is:

1. A method for detecting degradation in rotating performance comprising:
obtaining at least one emission signal from at least one rotating source via at least one broadband sensor;
processing the at least one emission signal through at least one data acquisition system employing Acoustic Emission Data Analysis Pattern Recognition and Neural Network Software to determine emission data;
wherein when the emission data includes:
amplitude greater than 90 dB;
initiation frequency below 20000 kHz;
absolute energy greater than $1 \times 10^7$ J;
frequency centroid less than 215 kHz;
peak frequency less than 150 kHz; and
signal strength greater than $5 \times 10^7$ pV sec;
the emission data is used to classify crack initiation and crack propagation:
separating the emission data into at least four (4) sections with each section being assigned at least one severity index and at least one historic index;
forming at least one intensity plot of the at least one severity index and the at least one historic index;
splitting the intensity plot into at least three differing levels of damage:
minimal damage,
crack initiation, and
failure;
wherein classifying crack propagation occurs in real time with respect to the at least one rotating source;
wherein the at least one severity index and the at least one historic index are higher at crack initiation than at failure; and
configuring at least one alarm to notify a user when a crack is initiating based on the at least one severity index and the at least one historic index.

2. The method of claim 1, wherein the set of correlated features includes rise time, amplitude, energy, average frequency, and at least one clustering method.

3. The method of claim 1, wherein classifying crack propagation determines a level of damage present within the at least one rotating source.

4. The method of claim 1, further comprising conducting intensity analysis via separating the emission data into a plurality of sections based on at least one signal strength spike within the emission data.

5. The method of claim 4, further comprising assigning a severity and historic index to each of the plurality of sections and creating an intensity plot from the assignment.

6. The method of claim 5, further comprising differentiating crack initiation and propagation within the rotating source as compared to failure of the rotating source based on the severity and historic index of the emission data.

7. The method of claim 6, further comprising triggering a signal alarm based on the severity and historic index indicating a crack has initiated or is propagating.

8. A non-destructive crack monitoring system comprising: at least one sensor configured for detecting emission data; wherein at least one pattern recognition system creates at least one cluster to compare at least two correlated features of the emission data to classify crack propagation within at least one rotating source; wherein when the emission data compared by the at least one cluster includes: amplitude greater than 90 dB; initiation frequency below 20000 kHz; absolute energy greater than $1 \times 10^7$ J; frequency centroid less than 215 kHz; peak frequency less than 150 kHz; and signal strength greater than $5 \times 10^7$ pV sec; the emission data is used to classify crack initiation and propagation: at least one data acquisition system configured for receiving the emission data from at least one piece of rotating machinery in real time via the at least one sensor and further configured for separating the emission data into at least four (4) sections with each section being assigned at least one severity index and at least one historic index; at least one pattern recognition system configured to separate the emission data into a plurality of sections based on signal strength spikes within the emission data and further configured for forming at least one intensity plot of the at least one severity index and the at least one historic index; at least one software platform for analyzing the emission data and correlating same to a crack condition within the at least one piece of rotating machinery; and splitting the intensity plot into at least three differing levels of damage: minimal damage, crack initiation, and failure.

9. The system of claim 8, further comprising the at least one pattern recognition system and the at least one software platform quantifying the emission data based on a set of correlated features including rise time, amplitude, energy, and average frequency.

10. The system of claim 8, wherein the at least one rotating piece of machinery is in use when the system monitors the at least one rotating piece of machinery.

11. The system of claim 8, further comprising the at least one software platform establishing a damage quantification procedure based on intensity analysis via separating the emission data into a plurality of sections based on at least one signal strength spike within the emission data.

12. The system of claim 11, further comprising the software platform assigning a severity and historic index to each of the plurality of sections and creating an intensity plot from the assignment.

13. The system of claim 12, further comprising the software platform differentiating crack initiation and propagation within the rotating source from failure of the rotating source based on the severity and historic index of the emission data.

14. The system of claim 13, wherein the system has a signal alarm that 1s triggered based on the severity and historic index indicating a crack has initiated or is propagating.

* * * * *